(12) United States Patent
Kim

(10) Patent No.: US 6,762,712 B2
(45) Date of Patent: Jul. 13, 2004

(54) FIRST-ARRIVING-PULSE DETECTION APPARATUS AND ASSOCIATED METHODS

(75) Inventor: Jonnathan H. Kim, Huntsville, AL (US)

(73) Assignee: Time Domain Corporation, Huntsville, AL (US)

(*) Notice: Subject to any disclaimer, the term of this patent is extended or adjusted under 35 U.S.C. 154(b) by 0 days.

(21) Appl. No.: 09/915,891

(22) Filed: Jul. 26, 2001

(65) Prior Publication Data

US 2003/0025631 A1 Feb. 6, 2003

(51) Int. Cl.[7] .............................................. G01S 13/08
(52) U.S. Cl. ........................ 342/135; 342/145; 342/189
(58) Field of Search ............................ 342/90–93, 125, 342/135, 145, 189, 194, 198, 378–384

(56) References Cited

U.S. PATENT DOCUMENTS

| | | | |
|---|---|---|---|
| 4,559,606 A | | 12/1985 | Jezo et al. |
| 4,672,638 A | | 6/1987 | Taguchi et al. |
| 4,736,460 A | | 4/1988 | Rilling |
| 4,752,969 A | | 6/1988 | Rilling |
| 4,797,950 A | | 1/1989 | Rilling |
| 5,402,450 A | | 3/1995 | Lennen |
| 5,414,729 A | | 5/1995 | Fenton |
| 5,445,029 A | * | 8/1995 | Falsetti et al. ................. 73/602 |
| 5,488,662 A | * | 1/1996 | Fox et al. ..................... 342/132 |
| 5,534,876 A | | 7/1996 | Erickson et al. |
| 5,644,597 A | | 7/1997 | Ueda |
| 5,687,196 A | | 11/1997 | Proctor, Jr. et al. |
| 5,815,539 A | | 9/1998 | Lennen |
| 5,832,035 A | * | 11/1998 | Fullerton ..................... 375/149 |
| 5,901,172 A | * | 5/1999 | Fontana et al. ............. 375/130 |
| 5,920,278 A | * | 7/1999 | Tyler et al. .................. 342/140 |
| 5,974,329 A | | 10/1999 | Wylie et al. |
| 6,043,771 A | * | 3/2000 | Clark et al. ................... 342/13 |
| 6,122,224 A | * | 9/2000 | Higgins ....................... 367/135 |
| 6,259,894 B1 | | 7/2001 | Tekinay |
| 6,313,620 B1 | * | 11/2001 | Richardson et al. ....... 324/76.31 |

OTHER PUBLICATIONS

Joon–Yong Lee et al., "Time Of Arrival Estimation Of The Direct Path Signal In UWB Communications," Proceedings of International Union Of Radio Science, URSI 2000, 1 pg., Jan. 9, 2001.

Joon–Yong Lee, "Ultra–Wideband Ranging In Dense Multipath Environments," Dissertation Presented To The Faculty Of The Graduate School University of Southern California, 115 pps., May 2002.

Joon–Yong Lee, "Time Of Arrival Estimation Of The Direct Path Signal In Ultrawideband Propagation," University of Southern California, 23 pps., Jan. 9, 2001.

Jong–Yong Lee, "UWB Ranging In Dense Multipath Environments," First Annual Review Of Uwb Muri, 19 pps., May 23, 2002.

Co–Pending United States patent application Ser. No. 09/915,620, entitled "Direct–Path–Signal Detection Apparatus and Associated Methods" (TDCO:007).

Search Report, PCT/US02/23547, 5 pgs.

* cited by examiner

Primary Examiner—Thomas H. Tarcza
Assistant Examiner—Isam Alsomiri
(74) Attorney, Agent, or Firm—O'Keefe, Egan & Peterman, LLP

(57) ABSTRACT

First-arriving-pulse detector (FAP) circuitry includes a correlator circuitry and a threshold circuitry. The correlator circuitry correlates a received signal with a template signal to provide an output signal. The threshold circuitry provides a first-arriving-pulse signal depending on the relative values of the output signal of the correlator circuitry and a threshold signal.

28 Claims, 34 Drawing Sheets

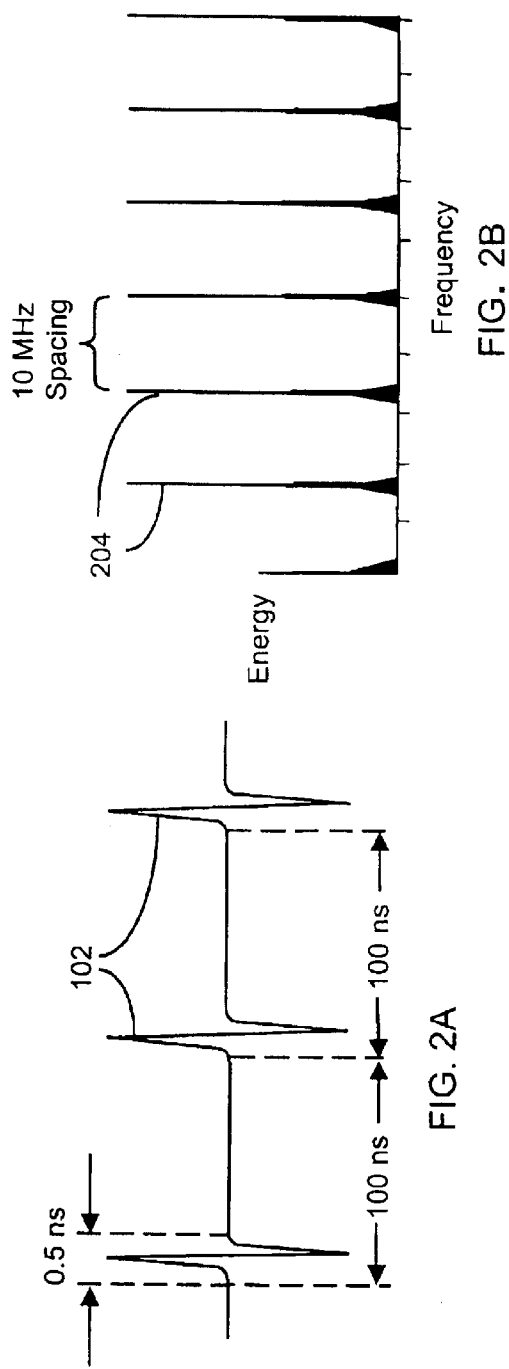
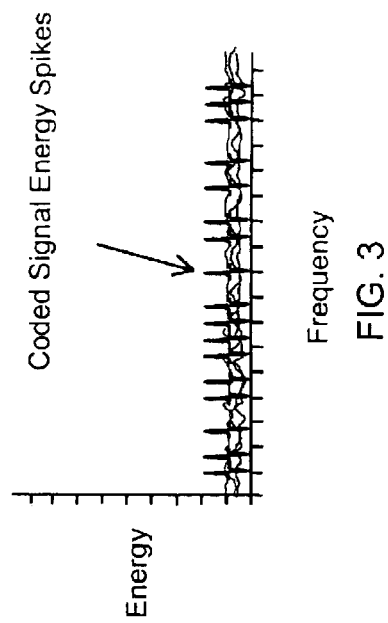

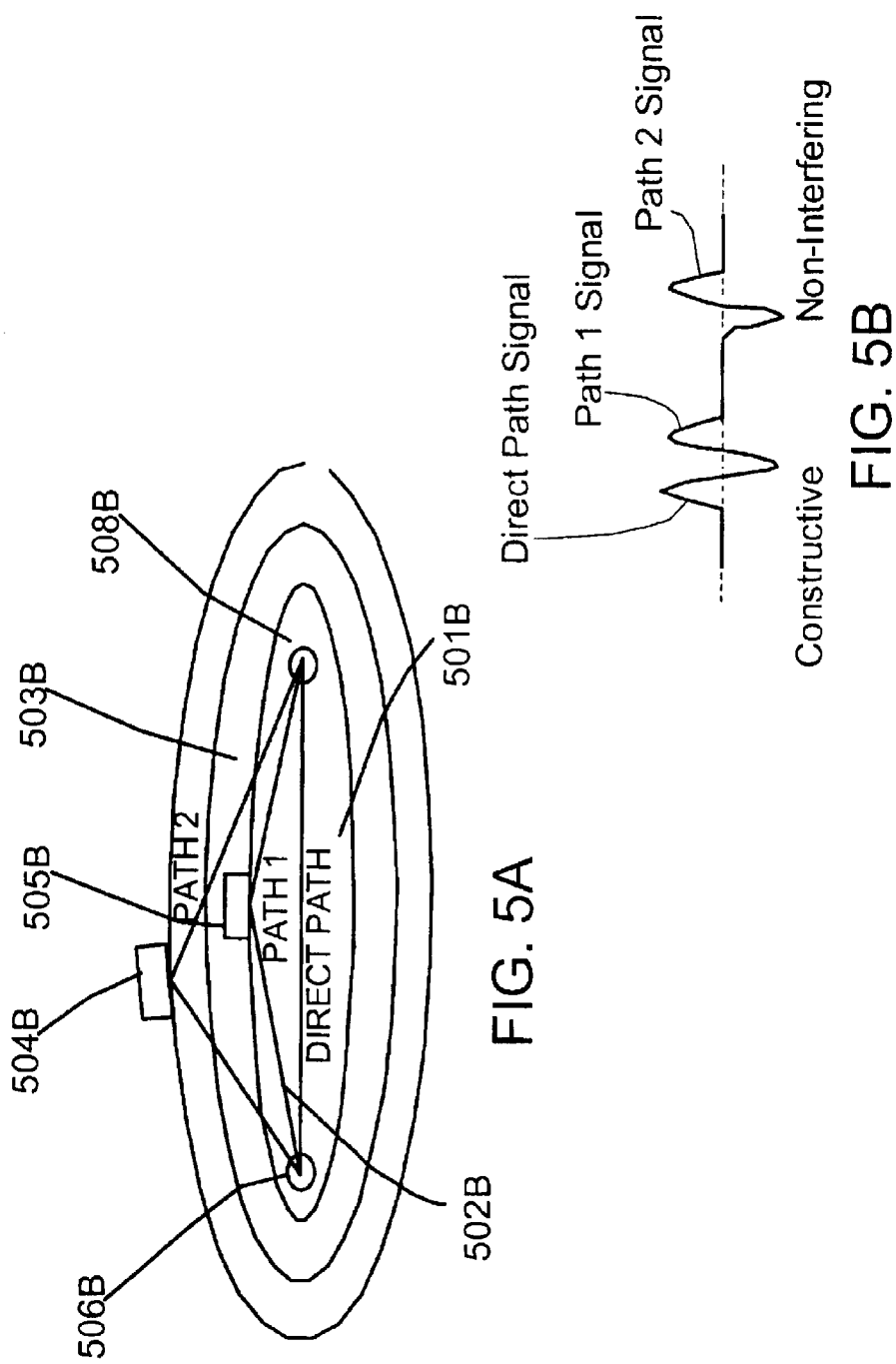

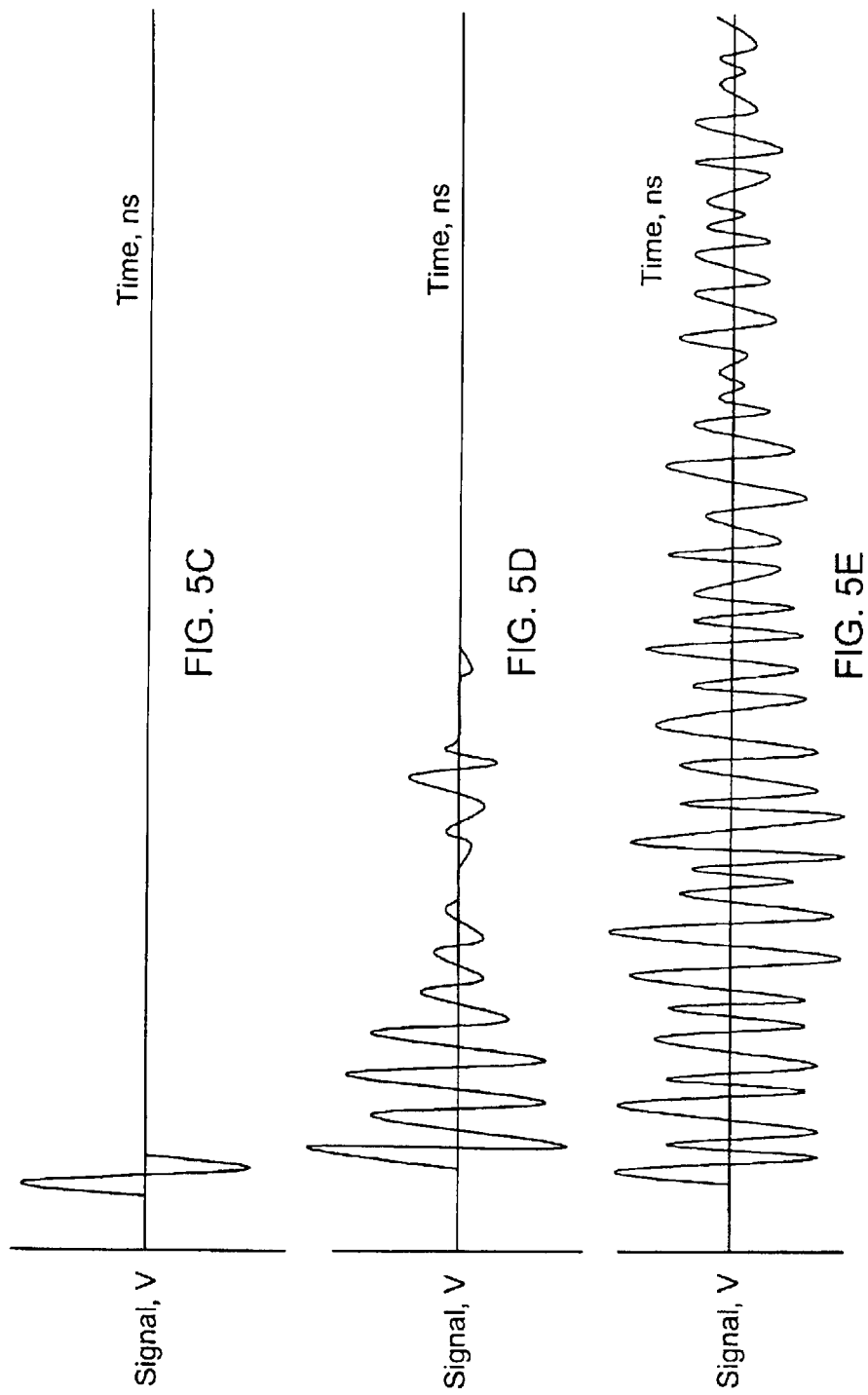

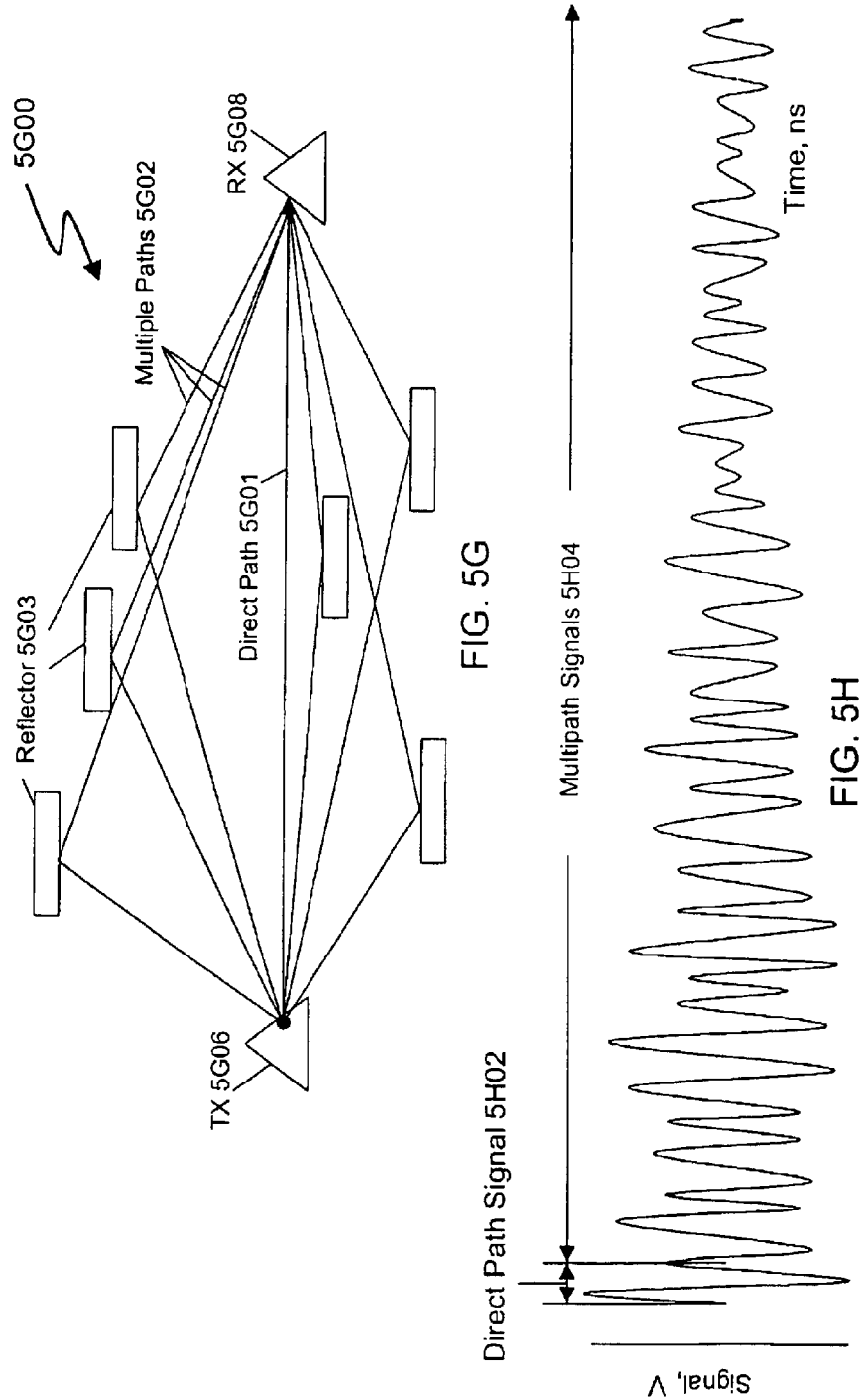

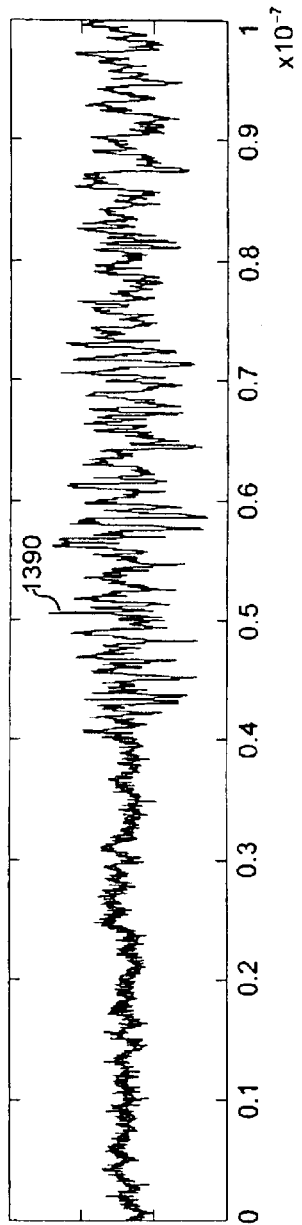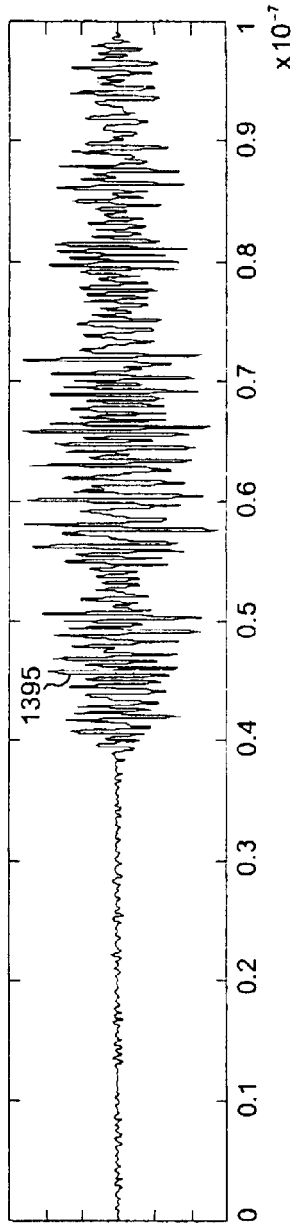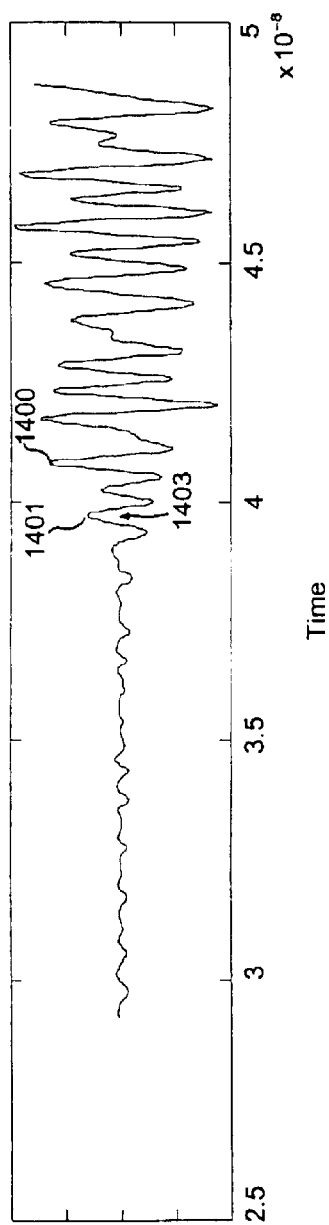

FIRST-ARRIVING-PULSE DETECTION APPARATUS AND ASSOCIATED METHODS

TECHNICAL FIELD OF THE INVENTION

This invention relates to communication, ranging, and positioning systems and, more particularly, to detecting first-arriving pulses in ultra-wideband communication, ranging, and positioning systems.

BACKGROUND

Modern communication and radar applications often involve positioning and ranging determinations. These applications typically seek to ascertain the range between two locations, for example between a radar station and a target, between two mobile stations, or between a base station and a mobile station. Other applications seek to determine the absolute or relative position of a target or a location.

Current positioning and ranging techniques suffer from a number of undesirable characteristics. For example, Global Positioning Satellite, or GPS, presently has a resolution limited to a few feet. Moreover, GPS systems rely on expensive, sophisticated satellites orbiting the earth. Thus, ranging and positioning applications that use GPS depend on the availability of the satellites and the signals that the satellites provide. In indoor areas, for example, GPS equipment typically cannot receive satellite signals and, thus, cannot provide reliable ranging and positioning information.

To overcome the shortcomings of GPS systems, other ranging and positioning systems use radar techniques. Radar systems usually transmit a signal that includes a plurality of pulses and, by timing the arrival of a signal reflected from a target, determine the range or position of a target. Those radar systems, like GPS systems, have a limited resolution. To provide improved resolution, some ranging and positioning systems use a single pulse. Proper and reliable operation of those systems, however, depends on their ability to distinguish the first pulse that may include information about the range, position, or both, of a target. Unfortunately, no known reliable techniques exist for detecting the first-arriving pulse and, thus, for determining the range, position, or both, of a target accurately and with improved resolution.

SUMMARY OF THE INVENTION

One aspect of the invention contemplates first-arriving pulse (FAP) circuitry for use in ranging, positioning, and communication systems. In one embodiment, FAP detector circuitry according to the invention includes a correlator circuitry configured to correlate a received signal with a template signal to provide an output signal. The FAP detector circuitry also includes a threshold circuitry configured to provide a first-arriving-pulse signal depending on the relative values of the output signal of the correlator circuitry and a threshold signal.

In another embodiment, a radio-frequency apparatus according to the invention includes a radio-frequency circuitry configured to receive a plurality of pulses that result from a transmission of a radio-frequency pulse in a multi-path propagation medium. The radio-frequency apparatus also includes a detector circuitry configured to discriminate from a noise floor a first pulse in the plurality of pulses.

In a third embodiment, a communication system according to the invention includes a transmitter circuitry configured to transmit a radio-frequency pulse into a multipath propagation medium and a receiver circuitry configured to receive a plurality of pulses that result from the transmission of the pulse into the multipath propagation medium. The communication system also includes a detector circuitry configured to detect the first pulse of the plurality of pulses.

Another aspect of the invention relates to methods of using FAP circuitry according to the invention in ranging, positioning, and communication systems. In one embodiment, a method of detecting a first-arriving pulse includes correlating a received signal with a template signal to provide a correlation output signal, and comparing the correlation output signal and a threshold signal to provide a first-arriving-pulse signal.

In a second embodiment, a method according to the invention for method of detecting a first pulse includes transmitting a radio-frequency pulse in a multipath propagation medium. The method also includes receiving, by using a radio-frequency circuitry, a plurality of pulses that result from the transmission of the radio-frequency pulse; and discriminating, by using a detector circuitry, a first pulse in the plurality of pulses from a noise floor.

DESCRIPTION OF THE DRAWINGS

The appended drawings illustrate only exemplary embodiments of the invention and therefore do not limit its scope, because the inventive concepts lend themselves to other equally effective embodiments. Like numerals in the drawings refer to the same, similar, or equivalent components, functions, systems, elements, or apparatus.

FIG. 2A illustrates a pulse train comprising pulses as in FIG. 1A.

FIG. 2B illustrates the frequency domain amplitude of the waveform of FIG. 2A.

FIG. 3 illustrates the frequency domain amplitude of a sequence of time coded pulses.

FIG. 5A illustrates a typical geometrical configuration giving rise to multipath received signals.

FIG. 5B illustrates exemplary multipath signals in the time domain.

FIGS. 5C–5E illustrate a signal plot of various multipath environments.

FIG. 5G illustrates a plurality of multipaths with a plurality of reflectors from a transmitter to a receiver.

FIG. 5H graphically represents signal strength as volts vs. time in a direct path and multipath environment.

FIG. 31A shows a signal that comprises an average of a plurality of signals received in a multipath environment.

FIG. 31B depicts a signal that comprises a correlated signal that corresponds to the averaged signal of FIG. 31A.

FIG. 31C illustrates an enlarged portion of the waveform shown in FIG. 31B, wherein the enlarged portion of the waveform shows the first-arriving pulse.

DETAILED DESCRIPTION OF THE INVENTION

Figures 1A, 1B:
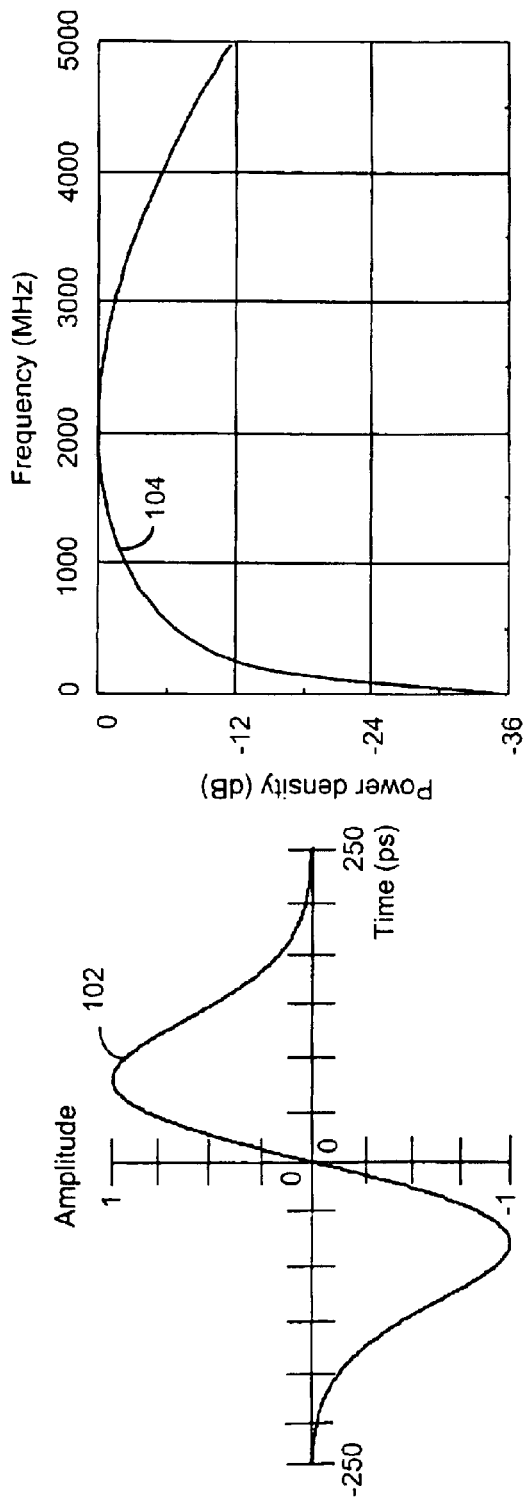
FIG. 1A illustrates a representative Gaussian Monocycle waveform in the time domain.
FIG. 1B illustrates the frequency domain amplitude of the Gaussian Monocycle of FIG. 1A.

Recent advances in communications technology have enabled an emerging, revolutionary ultra wideband technology (UWB) called impulse radio communications systems (hereinafter called impulse radio). To better understand the benefits of impulse radio to the present invention, the following review of impulse radio follows. Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997) and co-pending application Ser. No. 08/761,602 (filed Dec. 6, 1996) to Fullerton et al.

Uses of impulse radio systems are described in U.S. patent application Ser. No. 09/332,502, entitled, "System and Method for Intrusion Detection using a Time Domain Radar Array" and U.S. patent application Ser. No. 09/332,503, entitled, "Wide Area Time Domain Radar Array" both filed on Jun. 14, 1999 and both of which are assigned to the assignee of the present invention. The present patent application incorporates by reference the above patent documents.

Impulse Radio Basics

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example. However, someone skilled in the art will recognize that alternative modulation approaches may be used in replace of or in combination with time shift modulation approach without departing from the scope of the invention. In particular, amplitude modulation, especially antipodal amplitude modulation is useful and convenient in implementing instances of the invention.

In impulse radio communications, the pulse-to-pulse interval can be varied on a pulse-by-pulse basis by two components: an information component and a code component. Generally, conventional spread spectrum systems employ codes to spread the normally narrow band information signal over a relatively wide band of frequencies. A conventional spread spectrum receiver correlates these signals to retrieve the original information signal. Unlike conventional spread spectrum systems, in impulse radio communications codes are not needed for energy spreading because the monocycle pulses themselves have an inherently wide bandwidth. Instead, codes are used for channelization, energy smoothing in the frequency domain, resistance to interference, and reducing the interference potential to nearby receivers.

The impulse radio receiver is typically a direct conversion receiver with a cross correlator front end which coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. In impulse radio communications utilizing antipodal amplitude modulation, an information component comprising one or more bits of data typically amplitude modulates a sequence of pulses comprising a periodic timing signal with a plus one or minus one to represent binary data. This yields a modulated, coded timing signal that comprises a train of pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where, $\sigma$ is a time scaling parameter, t is time, $f$mono(t) is the waveform voltage, and e is the natural logarithm base.

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Prototypes have been built which have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to a receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by non-uniformly positioning each pulse relative to its nominal position according to a code such as a pseudo random code.

FIG. 3 is a plot illustrating the impact of a pseudo-noise (PN) code dither on energy distribution in the frequency domain (A pseudo-noise, or PN code is a set of time positions defining pseudo-random positioning for each pulse in a sequence of pulses). FIG. 3, when compared to FIG. 2B, shows that the impact of using a PN code is to destroy the comb line structure and spread the energy more uniformly. This structure typically has slight variations that are characteristic of the specific code used.

Coding also provides a method of establishing independent communication channels using impulse radio. Codes can be designed to have low cross correlation such that a pulse train lids using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to code dither) in response to the information signal. This amount is typically very small relative to the code shift. In a 10 Mpps system with a center frequency of 2 GHz., for example, the code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smoothes the spectrum, minimizing structure in the resulting spectrum.

Reception and Demodulation

Clearly, if there were a large number of impulse radio users within a confined area, there might be mutual interference. Further, while coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The code helps impulse systems discriminate between the intended impulse transmission and interfering transmissions from others.

Figure 4:
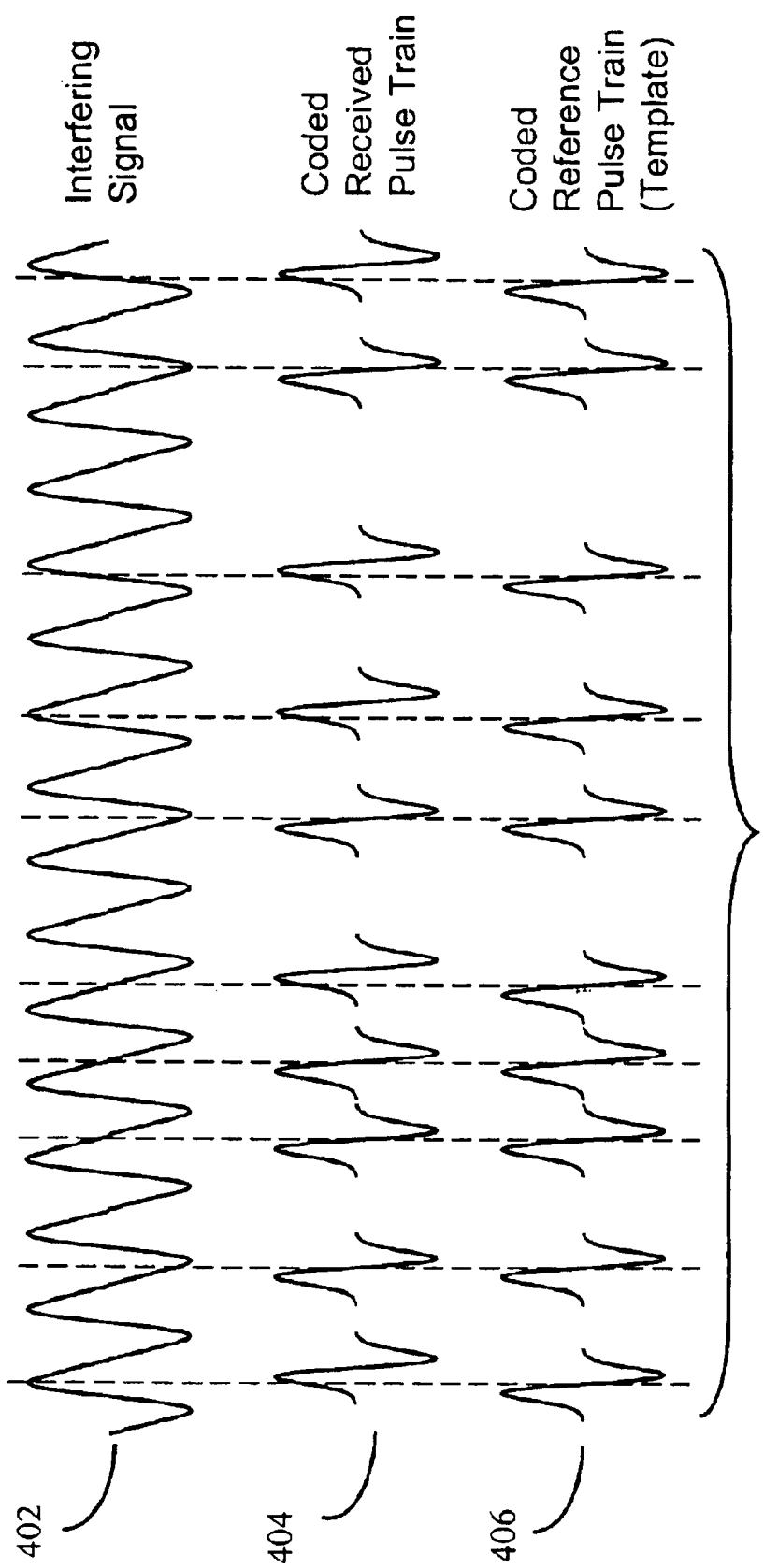
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultra-wideband impulse radio signal 404. The input is sampled by the cross correlator with a code dithered template signal 406. Without coding, the cross correlation would sample the interfering signal 402 with such regularity that the interfering signals could cause significant interference to the impulse radio receiver. However, when the transmitted impulse signal is encoded with the code dither (and the impulse radio receiver template signal 406 is synchronized with that identical code dither) the correlation samples the interfering signals non-uniformly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 KHz information bandwidth and a 10 MHz channel bandwidth yields a processing gain of 1000 or 30 dB. However, far greater processing gains are achieved by impulse radio systems, where the same 10 KHz information bandwidth is spread across a much greater 2 GHz channel bandwidth, resulting in a theoretical processing gain of 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Figure 5F:
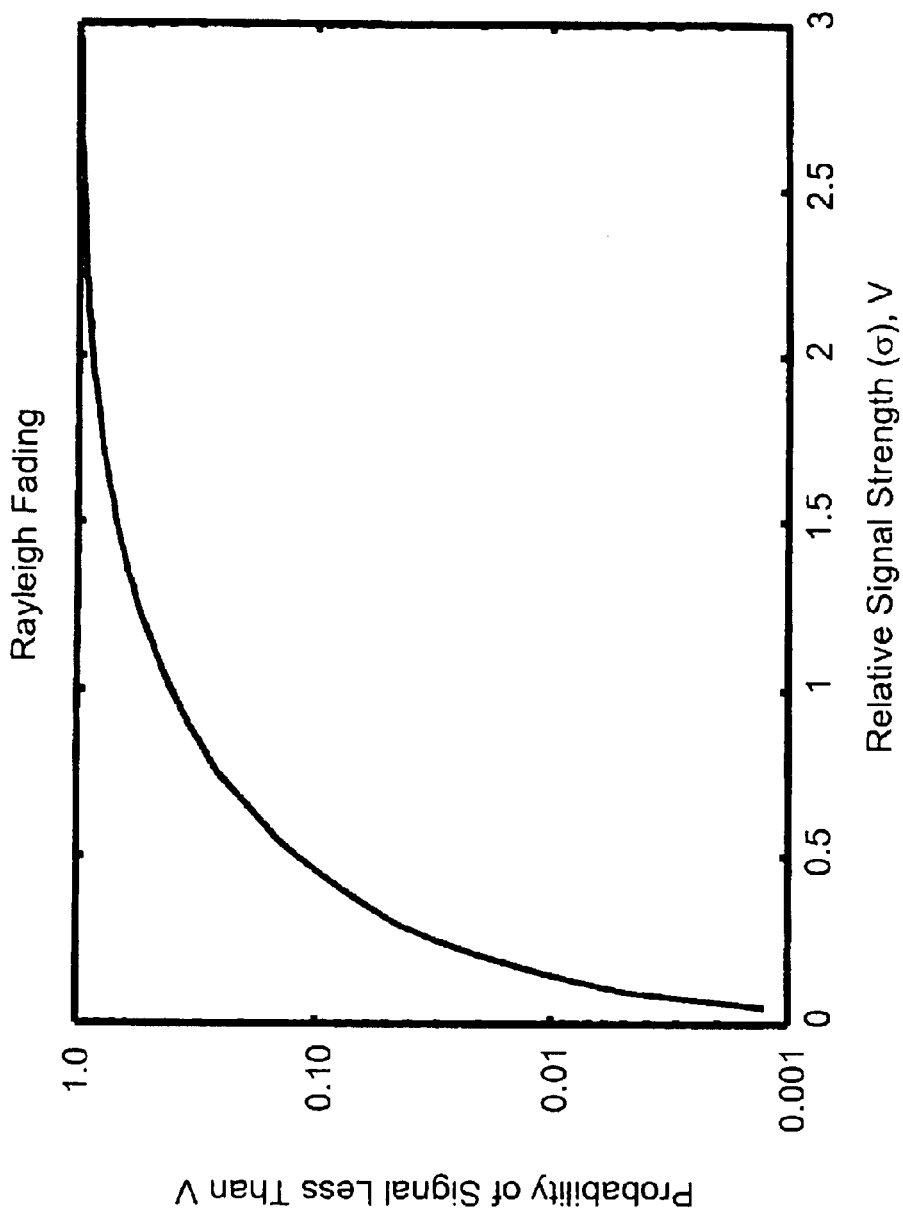
FIG. 5F illustrates the Rayleigh fading curve associated with non-impulse radio transmissions in a multipath environment.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight-line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.75 cm at 2 GHz center frequency) are the only multipath signals that can attenuate the direct path signal. This region is equivalent to the first Fresnel zone familiar to narrow band systems designers. Impulse radio, however, has no further nulls in the higher order Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal that propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. In this situation, the direct path signal power is small relative to the total signal power from the reflections.

An impulse radio receiver can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5B is a narrow band system and the delays are small relative to the data bit time, the received signal is a sum of a large number of sine waves of random amplitude and phase. In the idealized limit, the resulting envelope amplitude has been shown to follow a Rayleigh cumulative probability distribution as follows:

$$p(S_{dB})=1-\exp(-10^{S_{dB}/10})$$

where $S_{dB}$ is the instantaneous signal level expressed in as a decibel ratio to the average multipath power, and $p(S_{dB})$ is the probability that the signal less than $S_{dB}$. From the equation: $p(-10\ dB)=0.1$ hence, 10% of the time the signal is 10 or more dB below the average multipath power.

This distribution is shown in FIG. 5G. It can be seen in FIG. 5G that approximately 10% of the time, the signal is more than 10 dB below the average multipath power. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02, with the vertical axis being the signal strength in volts and horizontal axis representing time in nanoseconds. Multipath signals are graphically illustrated at 5H04.

Distance Measurement

Important for positioning, impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method allows ranging to occur within a network of radios without the necessity of a full duplex exchange among every pair of radios.

Exemplary Transceiver Implementation

Transmitter

Figures 6, 7:
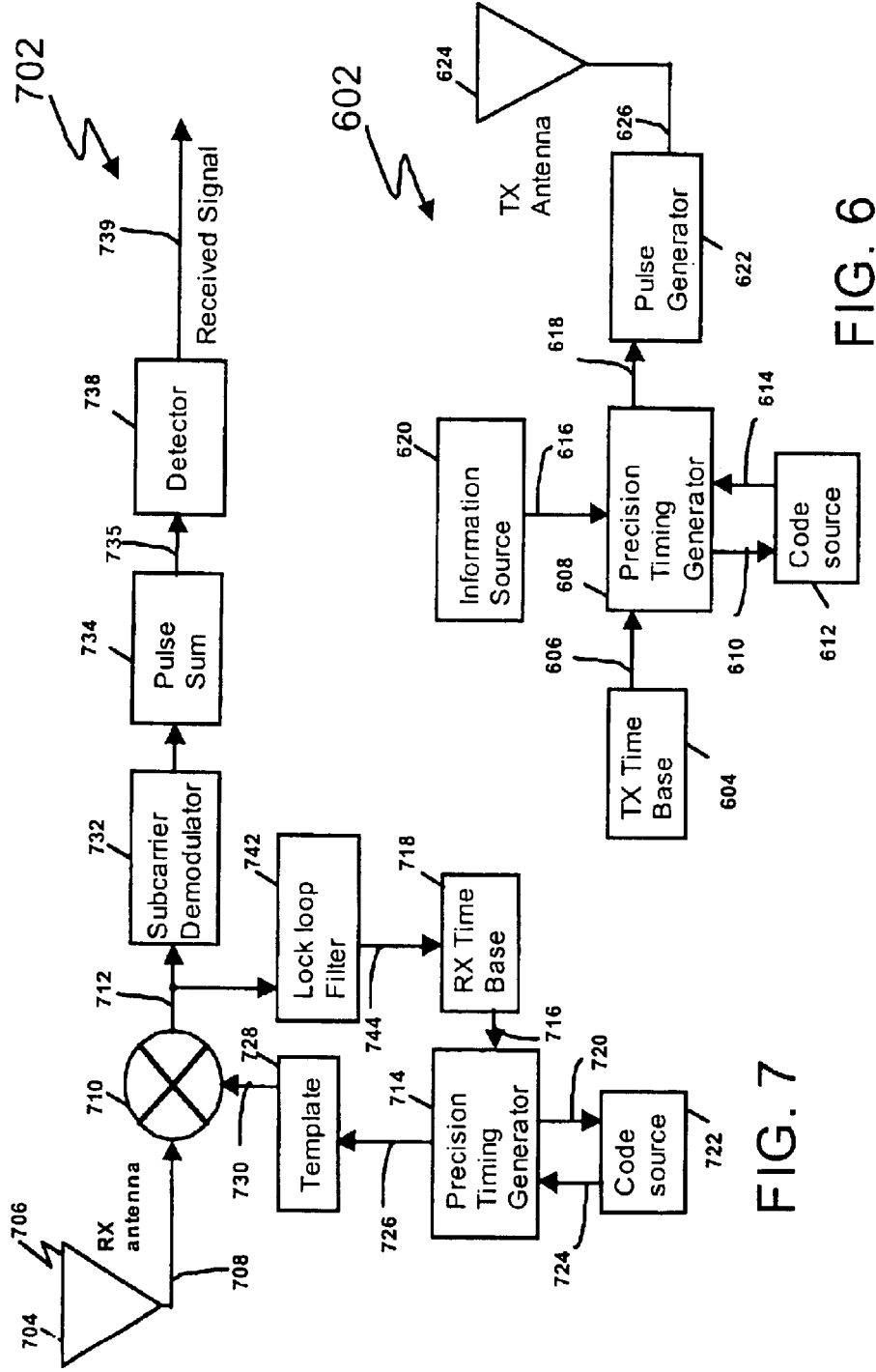
FIG. 6 illustrates a representative impulse radio transmitter functional diagram.
FIG. 7 illustrates a representative impulse radio receiver functional diagram.

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable codes and for outputting the PN codes as a code signal 614. Alternatively, maximum length shift registers or other computational means can be used to generate the codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultra-wideband, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a low-pass filter 742 (also referred to as lock loop filter 742). A control loop comprising the low-pass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8:
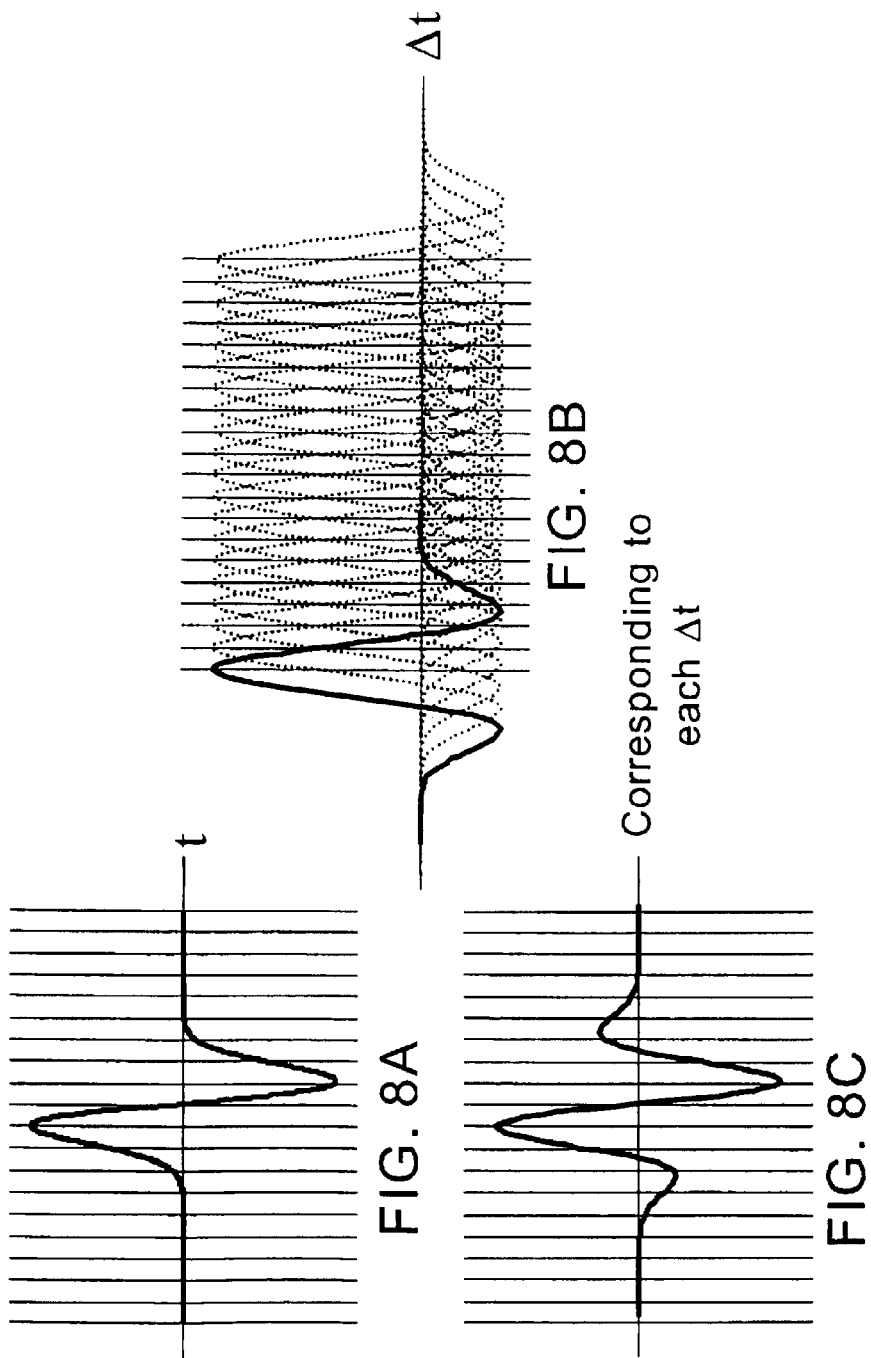
FIG. 8A illustrates a representative received pulse signal at the input to the correlator.
FIG. 8B illustrates a sequence of representative impulse signals in the correlation process.
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph does not show a waveform that is a function of time, but rather a function of time-offset. For any given pulse received, there is only one corresponding point that is applicable on this graph. This is the point corresponding to the time offset of the template signal used to receive that pulse. Further examples and details of precision timing can be found described in U.S. Pat. No. 5,677,927, and commonly owned co-pending application Ser. No. 09/146,524, filed Sep. 3, 1998, titled "Precision Timing Generator System and Method" both of which are incorporated herein by reference.

Recent Advances in Impulse Radio Communication Modulation Techniques

To improve the placement and modulation of pulses and to find new and improved ways that those pulses transmit information, various modulation techniques have been developed. The modulation techniques articulated above as well as the recent modulation techniques invented and summarized below are incorporated herein by reference.

FLIP Modulation

An impulse radio communications system can employ FLIP modulation techniques to transmit and receive flip modulated impulse radio signals. Further, it can transmit and receive flip with shift modulated (also referred to as quadrature flip time modulated (QFTM)) impulse radio signals. Thus, FLIP modulation techniques can be used to create two, four, or more different data states.

Flip modulators include an impulse radio receiver with a time base, a precision timing generator, a template generator, a delay, first and second correlators, a data detector and a time base adjustor. The time base produces a periodic timing signal that is used by the precision timing generator to produce a timing trigger signal. The template generator uses the timing trigger signal to produce a template signal. A delay receives the template signal and outputs a delayed template signal. When an impulse radio signal is received, the first correlator correlates the received impulse radio signal with the template signal to produce a first correlator output signal, and the second correlator correlates the received impulse radio signal with the delayed template signal to produce a second correlator output signal. The data detector produces a data signal based on at least the first correlator output signal. The time base adjustor produces a time base adjustment signal based on at least the second correlator output signal. The time base adjustment signal is used to synchronize the time base with the received impulse radio signal.

For greater elaboration of FLIP modulation techniques, the reader is directed to the patent application entitled, "Apparatus, System and Method for FLIP Modulation in an Impulse Radio Communication System", Ser. No. 09/537,692, filed Mar. 29, 2000 and assigned to the assignee of the present invention. This patent application is incorporated herein by reference.

Vector Modulation

Vector Modulation is a modulation technique which includes the steps of generating and transmitting a series of time-modulated pulses, each pulse delayed by one of four pre-determined time delay periods and representative of at least two data bits of information, and receiving and demodulating the series of time-modulated pulses to estimate the data bits associated with each pulse. The apparatus includes an impulse radio transmitter and an impulse radio receiver.

The transmitter transmits the series of time-modulated pulses and includes a transmitter time base, a time delay modulator, a code time modulator, an output stage, and a transmitting antenna. The receiver receives and demodulates the series of time-modulated pulses using a receiver time base and two correlators, one correlator designed to operate after a pre-determined delay with respect to the other correlator. Each correlator includes an integrator and a comparator, and may also include an averaging circuit that calculates an average output for each correlator, as well as a track and hold circuit for holding the output of the integrators. The receiver further includes an adjustable time delay circuit that may be used to adjust the pre-determined delay between the correlators in order to improve detection of the series of time-modulated pulses.

For greater elaboration of Vector modulation techniques, the reader is directed to the patent application entitled, "Vector Modulation System and Method for Wideband Impulse Radio Communications", Ser. No. 09/169,765, filed Dec. 9, 1999 and assigned to the assignee of the present invention. This patent application is incorporated herein by reference.

Receivers

Because of the unique nature of impulse radio receivers several modifications have been recently made to enhance system capabilities.

Multiple Correlator Receivers

Multiple correlator receivers utilize multiple correlators that precisely measure the impulse response of a channel and wherein measurements can extend to the maximum communications range of a system, thus, not only capturing ultra-wideband propagation waveforms, but also information on data symbol statistics. Further, multiple correlators enable rake acquisition of pulses and thus faster acquisition, tracking implementations to maintain lock and enable various modulation schemes. Once a tracking correlator is synchronized and locked to an incoming signal, the scanning correlator can sample the received waveform at precise time delays relative to the tracking point. By successively increasing the time delay while sampling the waveform, a complete, time-calibrated picture of the waveform can be collected.

For greater elaboration of utilizing multiple correlator techniques, the reader is directed to the patent application entitled, "System and Method of using Multiple Correlator Receivers in an Impulse Radio System", Ser. No. 09/537,264, filed Mar. 29, 2000 and assigned to the assignee of the present invention. This patent application is incorporated herein by reference.

Fast Locking Mechanisms

Methods to improve the speed at which a receiver can acquire and lock onto an incoming impulse radio signal have been developed. In one approach, a receiver comprises an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in detail in U.S. Pat. No. 5,832,035 to Fullerton, incorporated herein by reference.

In another approach, a receiver obtains a template pulse train and a received impulse radio signal. The receiver compares the template pulse train and the received impulse radio signal to obtain a comparison result. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, the reader is directed to the patent application entitled, "Method and System for Fast Acquisition of Ultra Wideband Signals", Ser. No. 09/538,292, filed Mar. 29, 2000 and assigned to the assignee of the present invention. This patent application is incorporated herein by reference.

Baseband Signal Converters

A receiver has been developed which includes a baseband signal converter device and combines multiple converter circuits and an RF amplifier in a single integrated circuit package. Each converter circuit includes an integrator circuit that integrates a portion of each RF pulse during a sampling period triggered by a timing pulse generator. The integrator capacitor is isolated by a pair of Schottky diodes connected to a pair of load resistors. A current equalizer circuit equalizes the current flowing through the load resistors when the integrator is not sampling. Current steering logic transfers load current between the diodes and a constant bias circuit depending on whether a sampling pulse is present.

For greater elaboration of utilizing baseband signal converters, the reader is directed to the patent application entitled, "Baseband Signal Converter for a Wideband Impulse Radio Receiver", Ser. No. 09/356,384, filed Jul. 16, 1999 and assigned to the assignee of the present invention. This patent application is incorporated herein by reference.

Power Control and Interference

Power Control

Power control improvements have been invented with respect to impulse radios. The power control systems comprise a first transceiver that transmits an impulse radio signal to a second transceiver. A power control update is calculated according to a performance measurement of the signal received at the second transceiver. The transmitter power of either transceiver, depending on the particular embodiment, is adjusted according to the power control update. Various performance measurements are employed according to the current invention to calculate a power control update, including bit error rate, signal-to-noise ratio, and received signal strength, used alone or in combination. Interference is thereby reduced, which is particularly important where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of utilizing baseband signal converters, the reader is directed to the patent application entitled, "System and Method for Impulse Radio Power Control", Ser. No. 09/332,501, filed Jun. 14, 1999 and assigned to the assignee of the present invention. This patent application is incorporated herein by reference.

Mitigating Effects of Interference

To assist in mitigating interference to impulse radio systems a methodology has been invented. The method comprises the steps of: (a) conveying the message in packets; (b) repeating conveyance of selected packets to make up a repeat package; and (c) conveying the repeat package a plurality of times at a repeat period greater than twice the occurrence period of the interference. The communication may convey a message from a proximate transmitter to a distal receiver, and receive a message by a proximate receiver from a distal transmitter. In such a system, the method comprises the steps of: (a) providing interference indications by the distal receiver to the proximate transmitter; (b) using the interference indications to determine predicted noise periods; and (c) operating the proximate transmitter to convey the message according to at least one of the following: (1) avoiding conveying the message during noise periods; (2) conveying the message at a higher power during noise periods; (3) increasing error detection coding in the message during noise periods; (4) re-transmitting the message following noise periods; (5) avoiding conveying the message when interference is greater than a first strength; (6) conveying the message at a higher power when the interference is greater than a second strength; (7) increasing error detection coding in the message when the interference is greater than a third strength; and (8)

re-transmitting a portion of the message after interference has subsided to less than a predetermined strength.

For greater elaboration of mitigating interference to impulse radio systems, the reader is directed to the patent application entitled, "Method for Mitigating Effects of Interference in Impulse Radio Communication", Ser. No. 09/587,033, filed Jun. 2, 1999 and assigned to the assignee of the present invention. This patent application is incorporated herein by reference.

Moderating Interference while Controlling Equipment

Yet another improvement to impulse radio includes moderating interference with impulse radio wireless control of an appliance; the control is affected by a controller remote from the appliance transmitting impulse radio digital control signals to the appliance. The control signals have a transmission power and a data rate. The method comprises the steps of: (a) in no particular order: (1) establishing a maximum acceptable noise value for a parameter relating to interfering signals; (2) establishing a frequency range for measuring the interfering signals; (b) measuring the parameter for the interference signals within the frequency range; and (c) when the parameter exceeds the maximum acceptable noise value, effecting an alteration of transmission of the control signals.

For greater elaboration of moderating interference while effecting impulse radio wireless control of equipment, the reader is directed to the patent application entitled, "Method and Apparatus for Moderating Interference While Effecting Impulse Radio Wireless Control of Equipment", Ser. No. 09/586,163, filed Jun. 2, 1999 and assigned to the assignee of the present invention. This patent application is incorporated herein by reference.

Coding Advances

The improvements made in coding can directly improve the characteristics of impulse radio as used in the present invention. Specialized coding techniques may be employed to establish temporal and/or non-temporal pulse characteristics such that a pulse train will possess desirable properties. Coding methods for specifying temporal and non-temporal pulse characteristics are described in commonly owned, co-pending applications entitled "A Method and Apparatus for Positioning Pulses in Time", Ser. No. 09/592,249, and "A Method for Specifying Non-Temporal Pulse Characteristics", Ser. No. 09/592,250, both filed Jun. 12, 2000, and both of which are incorporated herein by reference. Essentially, a temporal or non-temporal pulse characteristic value layout is defined, an approach for mapping a code to the layout is specified, a code is generated using a numerical code generation technique, and the code is mapped to the defined layout per the specified mapping approach.

A temporal or non-temporal pulse characteristic value layout may be fixed or non-fixed and may involve value ranges, discrete values, or a combination of value ranges and discrete values. A value range layout specifies a range of values for a pulse characteristic that is divided into components that are each subdivided into subcomponents, which can be further subdivided, ad infinitum. In contrast, a discrete value layout involves uniformly or non-uniformly distributed discrete pulse characteristic values. A non-fixed layout (also referred to as a delta layout) involves delta values relative to some reference value such as the characteristic value of the preceding pulse. Fixed and non-fixed layouts, and approaches for mapping code element values to them, are described in co-owned, co-pending applications, entitled "Method for Specifying Pulse Characteristics using Codes", Ser. No. 09/592,290 and "A Method and Apparatus for Mapping Pulses to a Non-Fixed Layout", Ser. No. 09/591,691, both filed on Jun. 12, 2000 and both of which are incorporated herein by reference.

A fixed or non-fixed characteristic value layout may include one or more non-allowable regions within which a characteristic value of a pulse is not allowed. A method for specifying non-allowable regions to prevent code elements from mapping to non-allowed characteristic values is described in co-owned, co-pending application entitled "A Method for Specifying Non-Allowable Pulse Characteristics", Ser. No. 09/592,289, filed Jun. 12, 2000 and incorporated herein by reference. A related method that conditionally positions pulses depending on whether or not code elements map to non-allowable regions is described in co-owned, co-pending application, entitled "A Method and Apparatus for Positioning Pulses Using a Layout having Non-Allowable Regions", Ser. No. 09/592,248 and incorporated herein by reference.

Typically, a code consists of a number of code elements having integer or floating-point values. A code element value may specify a single pulse characteristic (e.g., pulse position in time) or may be subdivided into multiple components, each specifying a different pulse characteristic. For example, a code having seven code elements each subdivided into five components (c0–c4) could specify five different characteristics of seven pulses. A method for subdividing code elements into components is described in commonly owned, co-pending application entitled "Method for Specifying Pulse Characteristics using Codes", Ser. No. 09/592,290, filed Jun. 12, 2000 previously referenced and again incorporated herein by reference. Essentially, the value of each code element or code element component (if subdivided) maps to a value range or discrete value within the defined characteristic value layout. If a value range layout is used an offset value is typically employed to specify an exact value within the value range mapped to by the code element or code element component.

The signal of a coded pulse train can be generally expressed:

$$s_{tr}^{(k)}(t) = \sum_{j} (-1)^{f_j^{(k)}} a_j^{(k)} \omega\left(c_j^{(k)} t - T_j^{(k)}, b_j^{(k)}\right)$$

where k is the index of a transmitter, j is the index of a pulse within its pulse train, $(-1)f_j^{(k)}$, $a_j^{(k)}$, $c_j^{(k)}$, and $b_j^{(k)}$ are the coded polarity, amplitude, width, and waveform of the jth pulse of the kth transmitter, and $T_j^{(k)}$ is the coded time shift of the jth pulse of the kth transmitter. Note: When a given non-temporal characteristic does not vary (i.e., remains constant for all pulses in the pulse train), the corresponding code element component is removed from the above expression and the non-temporal characteristic value becomes a constant in front of the summation sign.

Various numerical code generation methods can be employed to produce codes having certain correlation and spectral properties. Such codes typically fall into one of two categories: designed codes and pseudorandom codes.

A designed code may be generated using a quadratic congruential, hyperbolic congruential, linear congruential, Costas array or other such numerical code generation technique designed to generate codes guaranteed to have certain correlation properties. Each of these alternative code generation techniques has certain characteristics to be considered in relation to the application of the pulse transmission system employing the code. For example, Costas codes have nearly ideal autocorrelation properties but somewhat less than ideal cross-correlation properties, while linear congruential codes have nearly ideal cross-correlation properties but less than ideal autocorrelation properties. In some cases, design tradeoffs may require that a compromise between two or more code generation techniques be made such that a code is generated using a combination of two or more techniques. An example of such a compromise is an extended quadratic congruential code generation approach that uses two 'independent' operators, where the first operator is linear and the second operator is quadratic.

Accordingly, one, two, or more code generation techniques or combinations of such techniques can be employed to generate a code without departing from the scope of the invention.

A pseudorandom code may be generated using a computer's random number generator, binary shift-register(s) mapped to binary words, a chaotic code generation scheme, or another well-known technique. Such 'random-like' codes are attractive for certain applications since they tend to spread spectral energy over multiple frequencies while having 'good enough' correlation properties, whereas designed codes may have superior correlation properties but have spectral properties that may not be as suitable for a given application.

Computer random number generator functions commonly employ the linear congruential generation (LCG) method or the Additive Lagged-Fibonacci Generator (ALFG) method. Alternative methods include inversive congruential generators, explicit-inversive congruential generators, multiple recursive generators, combined LCGs, chaotic code generators, and Optimal Golomb Ruler (OGR) code generators. Any of these or other similar methods can be used to generate a pseudorandom code without departing from the scope of the invention, as will be apparent to those skilled in the relevant art.

Detailed descriptions of code generation and mapping techniques are included in a co-owned patent application entitled "A Method and Apparatus for Positioning Pulses in Time", Ser. No. 09/638,150, which is hereby incorporated by reference.

It may be necessary to apply predefined criteria to determine whether a generated code, code family, or a subset of a code is acceptable for use with a given UWB application. Criteria to consider may include correlation properties, spectral properties, code length, non-allowable regions, number of code family members, or other pulse characteristics. A method for applying predefined criteria to codes is described in co-owned, co-pending application, entitled "A Method and Apparatus for Specifying Pulse Characteristics using a Code that Satisfies Predefined Criteria", Ser. No. 09/592,288, filed Jun. 12, 2000 and is incorporated herein by reference.

In some applications, it may be desirable to employ a combination of two or more codes. Codes may be combined sequentially, nested, or sequentially nested, and code combinations may be repeated. Sequential code combinations typically involve transitioning from one code to the next after the occurrence of some event. For example, a code with properties beneficial to signal acquisition might be employed until a signal is acquired, at which time a different code with more ideal channelization properties might be used. Sequential code combinations may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in desirable spectral properties. A method for applying code combinations is described in co-owned, co-pending application, entitled "A Method and Apparatus for Applying Codes Having Pre-Defined Properties", Ser. No. 09/591,690, filed Jun. 12, 2000 which is incorporated herein by reference.

Novel First-Arriving-Pulse Detector Circuitry

This invention contemplates first-arriving-pulse (FAP) detector circuitry that identifies a first-arriving pulse in a signal that includes a plurality of pulses. In some embodiments, the invention relates to FAP detector circuitry that discriminates a first-arriving pulse in a radio signal received in a multipath environment.

Figure 9:
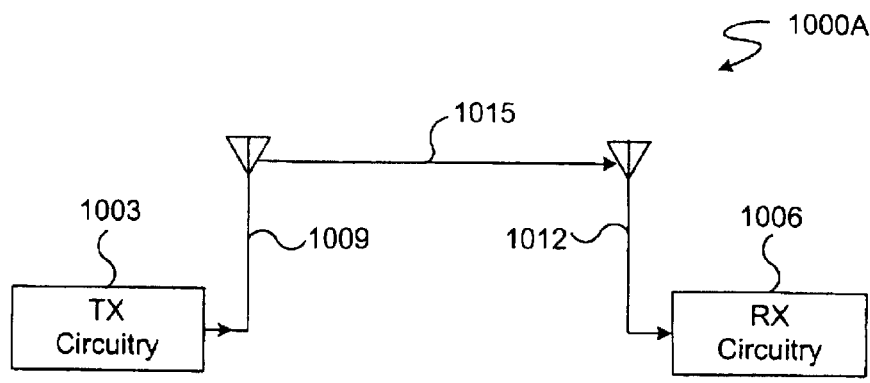
FIG. 9 depicts a communication system that includes a transmitter circuitry transmitting a radio signal to a receiver circuitry.

FIGS. 9–15 help to illustrate the desirability of distinguishing FAP signals in a communication, radar, ranging, or positioning system. FIG. 9 shows a communication system 1000A that includes a transmitter circuitry 1003 and a receiver circuitry 1006. The transmitter circuitry 1003 transmits a pulse to the receiver circuitry 1006 via a transmitter antenna 1009. The transmitted pulse travels via a direct-path 1015 in a propagation medium. The receiver 1006 receives the transmitted signal via a receiver antenna 1012.

Figure 10A:
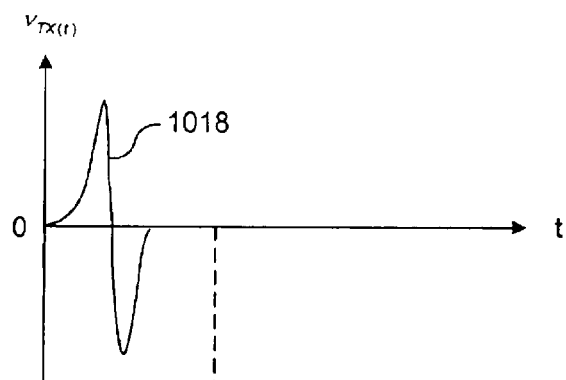
FIG. 10A illustrates a pulse transmitted by the transmitter circuitry in FIG. 9.
Figure 10B:
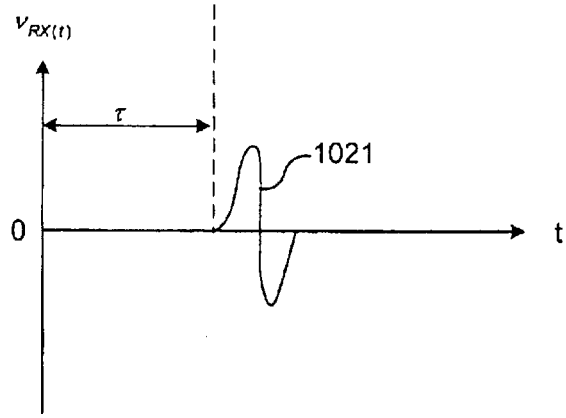
FIG. 10B depicts a pulse received by the receiver circuitry in the system shown in FIG. 9.

FIG. 10A shows the transmitted pulse 1018 as a function of time. In exemplary embodiments, the transmitted pulse 1018 comprises an ultra-wideband pulse, or a Gaussian monocycle. FIG. 10B depicts the received pulse 1021. Note that the received pulse 1021 has a delay, shown as $\tau$ in FIG. 10B, with respect to the transmitted pulse 1018. The delay $\tau$ represents the propagation delay from the transmitter circuitry 1003 to the receiver circuitry 1006 along the direct path 1015. In other words, the transmitter circuitry 1003 provides the pulse to the transmitter antenna 1009. The transmitter antenna 1009 transmits a pulse at t=0, i.e., the origin on the horizontal axis on the graphs in FIGS. 10A and 10B. The transmitted pulse propagates along the direct path 1015 from the transmitter antenna 1009 to the receiver antenna 1012. After the delay $\tau$, the transmitted pulse arrives at the receiver antenna 1012. The receiver antenna 1012 provides the received pulse to the receiver circuitry 1006. The receiver circuitry 1006 thereafter processes the received signal.

Figure 11:
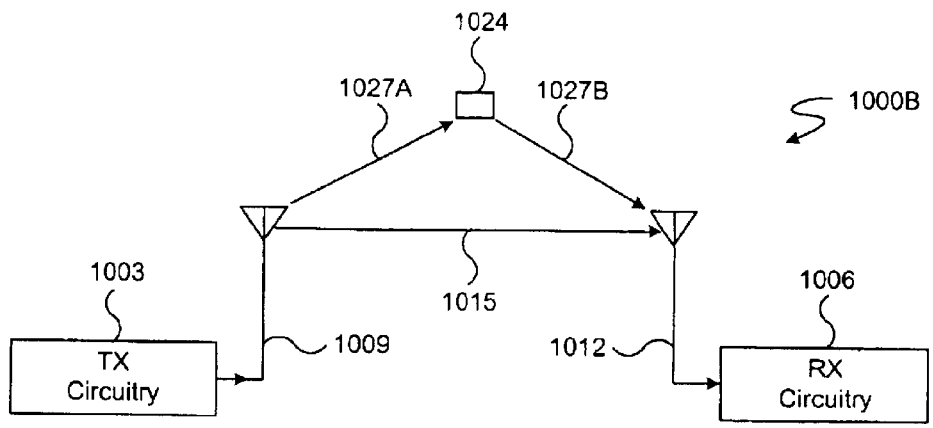
FIG. 11 shows a communication system that includes a transmitter circuitry and a receiver circuitry, wherein the transmitter circuitry transmits a pulse into a propagation medium that contains an object that causes multipath signals to arrive at the receiver circuitry.

FIG. 11 illustrates a communication system 1000B that includes a transmitter circuitry 1003 and a receiver circuitry 1006. The transmitter circuitry transmits a pulse to the receiver circuitry 1006 via a transmitter antenna 1009. The transmitted pulse propagates via a direct path 1015 in a propagation medium. The receiver 1006 receives the transmitted signal via a receiver antenna 1012. The propagation environment in FIG. 11 includes also an object 1024. The object 1024 may comprise a wall, a building, an obstruction, or the like.

Figure 12A:
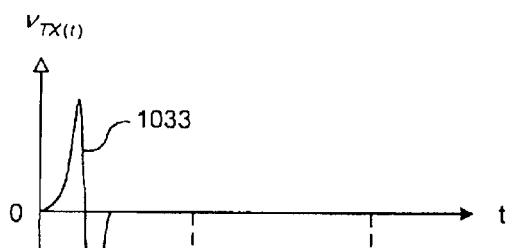
FIG. 12A depicts the signal that the transmitter circuitry transmits in the system of FIG. 11.
Figure 12B:
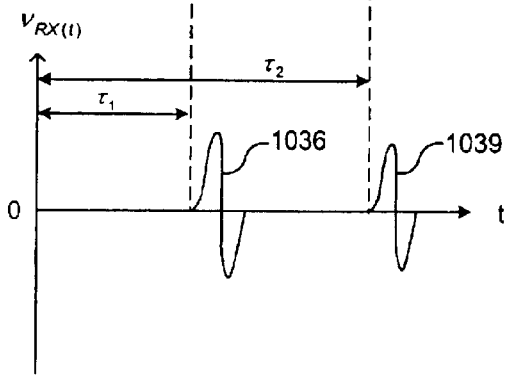
FIG. 12B shows the multipath signals that the receiver circuitry of FIG. 11 receives.

Unlike the system in FIG. 9, in the system of FIG. 11 the receiver circuitry 1006 receives two signals. FIG. 12A shows the transmitted pulse 1033 as a function of time. In exemplary embodiments, the transmitted pulse 1033 comprises an ultra-wideband pulse, or a Gaussian monocycle. FIG. 12B depicts two received pulses 1036 and 1039. A direct-path pulse 1036 corresponds to the signal that propagates along the direct path 1015. The direct-path signal 1036 arrives first at the receiver antenna 1012 and, therefore, constitutes the first-arriving pulse. The pulse 1036 reaches the receiver antenna after a delay shown as $\tau_1$ in FIG. 12B. The delay $\tau_1$ represents the propagation delay from the transmitter circuitry 1003 to the receiver circuitry 1006 along the direct-path 1015, as described above. As noted above, detecting the arrival of the first-arriving pulse 1036 is desirable and represents a challenge in many ranging and positioning applications. FAP detector circuits according to the invention provide a solution to that challenge.

The transmitted pulse also propagates to the object 1024 along a path 1027A. The pulse interacts with the object (e.g., reflects from the object) and thereafter propagates to the receiver antenna 1012 along a path 1027B. This second pulse 1039 arrives at the receiver antenna 1012 after a delay shown as $\tau_2$ in FIG. 12B. The delay $\tau_2$ represents the propagation delay from the transmitter circuitry 1003 to the receiver circuitry 1006 along the path 1027A and the path 1027B. In a typical application, $\tau_1$ and $\tau_2$ may differ from each other by a relatively small amount.

Figure 13:
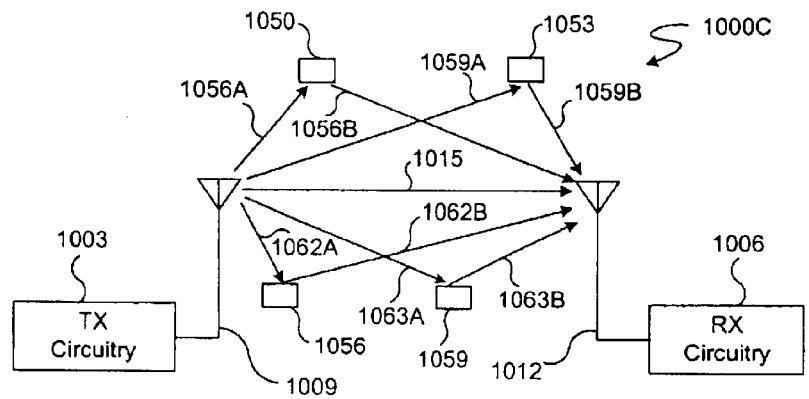
FIG. 13 illustrates a communication system that includes a transmitter circuitry and a receiver circuitry, wherein the transmitter circuitry transmits a pulse into a propagation medium that contains four objects that cause multipath signals to arrive at the receiver circuitry.

FIG. 13 illustrates a communication system 1000C that includes a transmitter circuitry 1003 and a receiver circuitry 1006. The transmitter circuitry transmits a pulse to the receiver circuitry 1006 via a transmitter antenna 1009. In exemplary embodiments, the transmitted pulse comprises an ultra-wideband pulse, or a Gaussian monocycle. The transmitted pulse propagates via a direct path 1015 in a propagation medium. The receiver 1006 receives the transmitted signal via a receiver antenna 1012. The propagation environment in FIG. 13 includes also four objects 1050, 1053, 1056, and 1059, respectively. Each of the four objects 1050, 1053, 1056, and 1059 may comprise a wall, a building, an obstruction, or the like. Thus, the receiver circuitry 1006 receives five signals. One of the five signals comprises the direct-path signal. The other four signals result from the interaction of the transmitted pulse with the objects 1050, 1053, 1056, and 1059.

In addition to the direct-path 1015, the transmitted pulse also travels along the paths 1056A–1056B, 1059A–1059B, 1062A–1062B, and 1063A–1063B. The paths 1056A–1056B, 1059A–1059B, 1062A–1062B, and 1063A–1063B constitute the paths that the transmitted pulse travels from the transmitter antenna 1009 to the objects 1050, 1053, 1056, and 1059, respectively, in a manner analogous to that described in connection with FIG. 11.

Figure 14A:
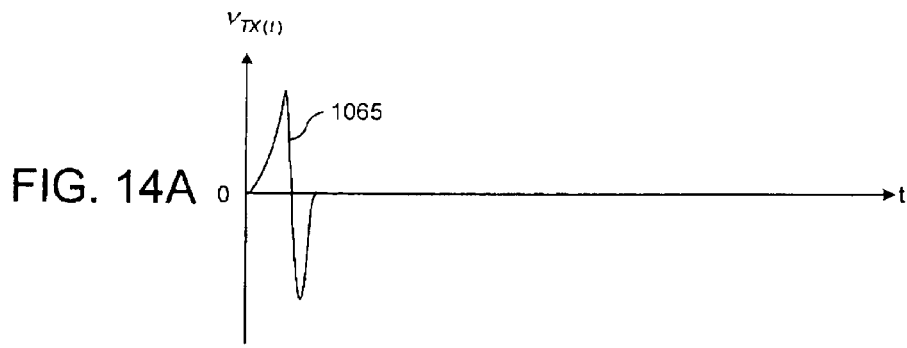
FIG. 14A depicts the signal that the transmitter circuitry transmits in the system of FIG. 13.
Figure 14B:
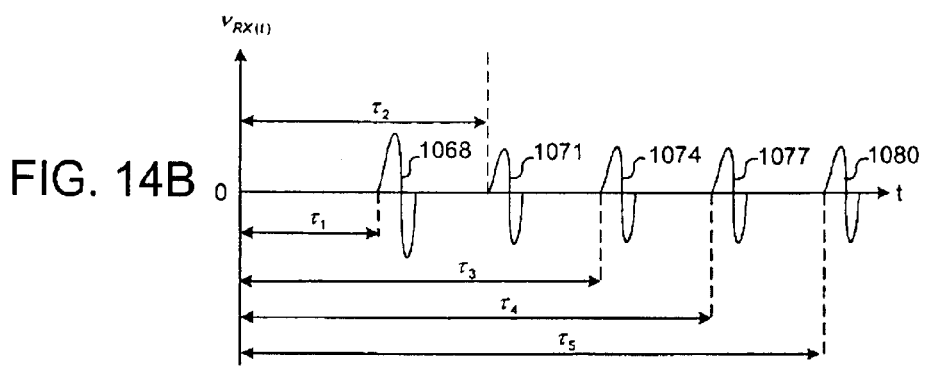
FIG. 14B shows the multipath signals that the receiver circuitry of FIG. 13 receives.

FIG. 14A shows the transmitted pulse 1065 as a function of time. In exemplary embodiments, the transmitted pulse 1065 comprises an ultra-wideband pulse, or a Gaussian monocycle. FIG. 14B depicts five received pulses 1068, 1071, 1074, 1077, and 1080, which correspond to signal paths 1015, 1056A–1056B, 1059A–1059B, 1062A–1062B, and 1063A–1063B, respectively. A direct-path pulse 1068 corresponds to the signal that propagates along the direct path 1015. The direct-path signal 1068 arrives first at the receiver antenna 1012 and, therefore, constitutes the first-arriving pulse. The pulse 1068 reaches the receiver antenna 1012 after a delay shown as $\tau_1$ in FIG. 14B. The delay $\tau_1$ represents the propagation delay from the transmitter circuitry 1003 to the receiver circuitry 1006 along the direct-path 1015, as described above. A FAP detector circuitry according to the invention detects the first-arriving pulse 1068.

The transmitted pulse also propagates to the objects 1050, 1053, 1056, and 1059, along paths 1056A, 1059A, 1062A, and 1063A, respectively. The transmitted pulse interacts with the objects 1050, 1053, 1056, and 1059 (e.g., reflects from the objects) and thereafter propagates to the receiver antenna 1012 along paths 1056B, 1059B, 1062B, and 1063B, respectively. The pulses 1071, 1074, and 1077 arrive at the receiver antenna 1012 after delays shown in FIG. 14B as $\tau_2, \tau_3, \tau_4$, and $\tau_5$, respectively. The delays $\tau_2, \tau_3, \tau_4,$ and $\tau_5$ represent the propagation delays from the transmitter circuitry 1003 to the receiver circuitry 1006 along the paths 1056A–1056B, 1059A–1059B, 1062A–1062B, and 1063A–1063B, respectively.

FIGS. 11 and 13 show two and four objects within the multipath environments in which the communication systems 1000B and 1000C operate, respectively. A multipath environment, however, may include other numbers of objects, as persons skilled in the art would understand. In some circumstances, the multipath environment may include many objects or obstructions that give rise a correspondingly large number of multipath signals to arrive at a receiver circuitry.

Figure 15:
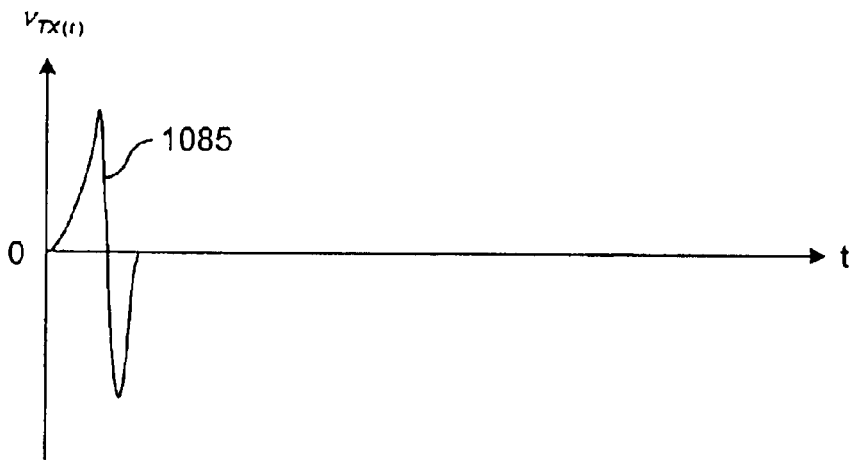
FIG. 15A depicts a signal that a transmitter circuitry transmits into a propagation medium that contains a plurality of objects that cause multipath signals to arrive at a receiver circuitry.
FIG. 15B shows the multipath signals corresponding to the transmitted signal of FIG. 15A that the receiver circuitry receives.
Figure 15:
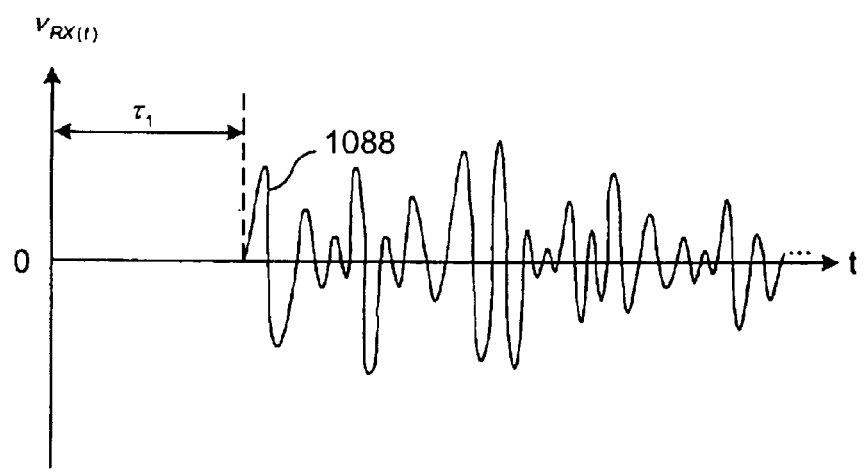

FIG. 15 shows the waveforms associated with a multipath environment that includes a plurality of objects or obstructions. FIG. 15A illustrates a transmitted pulse 1085 as a function of time. In exemplary embodiments, the transmitted pulse 1085 comprises an ultra-wideband pulse, or a Gaussian monocycle. FIG. 15B depicts a received signal 1088. The received signal 1088 includes a first-arriving-pulse that typically corresponds to the direct-path pulse. The received signal 1088 also includes a plurality of other pulses that correspond to the objects or obstructions within the multipath environment. Note that, because of interactions within the multipath environment, the pulses within the received signal 1088 may have varying peaks and amplitudes. In other words, constructive and destructive interference among the plurality of pulses arriving at the receiver circuitry may give rise to the plurality of pulses within the received signal 1088. A FAP detector circuitry according to the invention detects the first-arriving pulse in the received pulse 1088, thus helping to provide ranging and positioning systems with improved accuracy and resolution.

Figure 16:
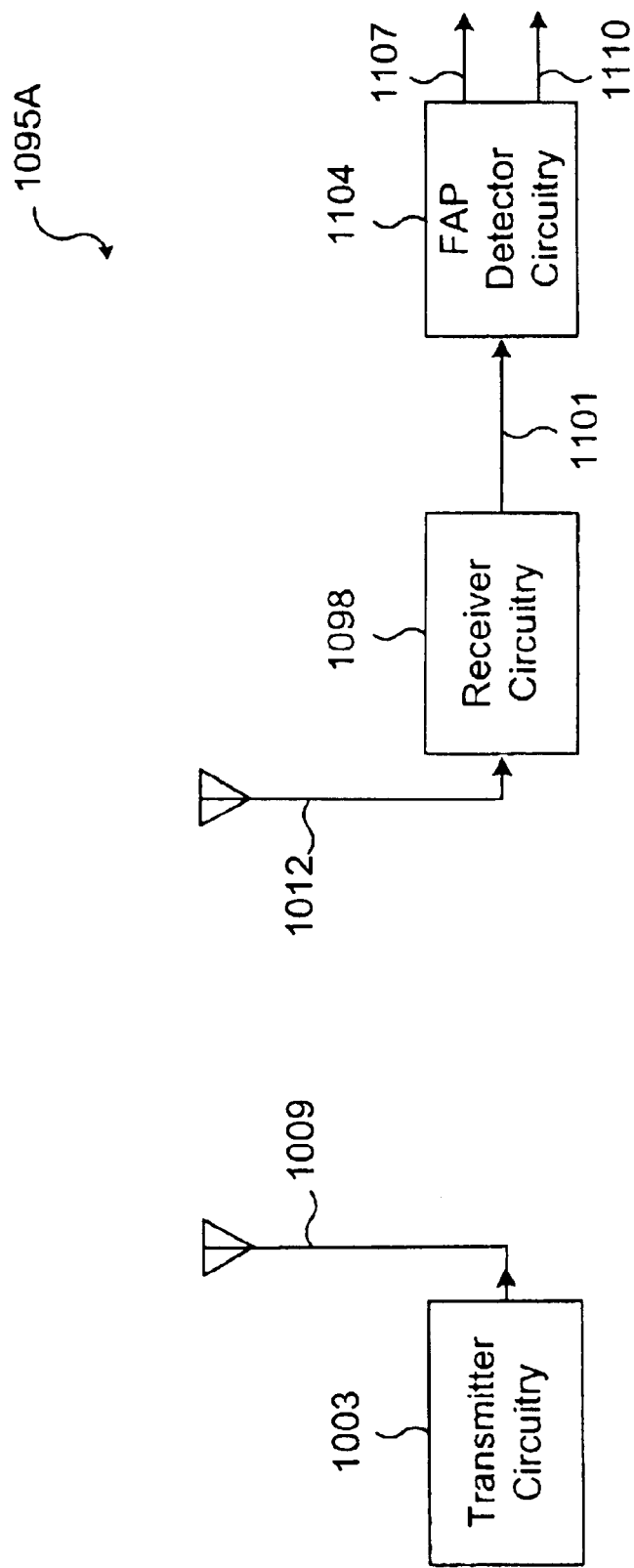
FIG. 16 illustrates a communication system that includes a transmitter circuitry, a receiver circuitry, and a first-arriving pulse (FAP) detector circuitry according to the invention.

FIG. 16 shows a communication system 1095A that includes a FAP detector circuitry 1104 according to the invention. The communication system 1095A includes a transmitter circuitry 1003, a receiver circuitry 1098, and the FAP detector circuitry 1104. The transmitter circuitry 1003 transmits radio signals to the receiver circuitry 1098 via a transmitter antenna 1009. A receiver antenna 1012 receives the transmitted signal and provides it to the receiver circuitry 1098.

The receiver circuitry 1098 communicates with the FAP detector circuitry 1104 via a link 1101. The link 1101 may comprise one or more signal lines, as desired. The link 1101 may provide a radio signal, or its processed, filtered, or reconstructed version, to the FAP detector circuitry 1104. The FAP detector circuitry 1104 accepts the signal from the receiver circuitry 1098 and processes it to detect the first-arriving pulse. The FAP detector circuitry 1104 may provide a signal or set of signals 1107 that includes information about the first-arriving pulse. The FAP detector circuitry may provide the signal 1107 to follow-on circuitry, for example, a processor circuitry, for further processing. The processor circuitry may comprise a digital-signal processor (DSP) or other types of processor. The FAP detector circuitry 1104 may provide another signal or set of signals 1110 that may include other information. For example, the signal or set of signals 1110 may provide the characteristics of the multipath environment, information about the received signal other than about the first-arriving pulse, information about the noise floor and the like.

FAP detector circuits according to the invention use information about the received signal and the communication link or channel, for example, the characteristics of the noise floor, to detect the first-arriving pulse. Thus, FAP detector circuits according to the invention process the received signal, which comprises a first-arriving pulse and, potentially, many other pulses that result from the interaction of the transmitted pulse with a multipath environment. In exemplary embodiments, a multiple-correlator scanning receiver provides the received signal to the FAP detector circuitry according to the invention.

Figure 17:
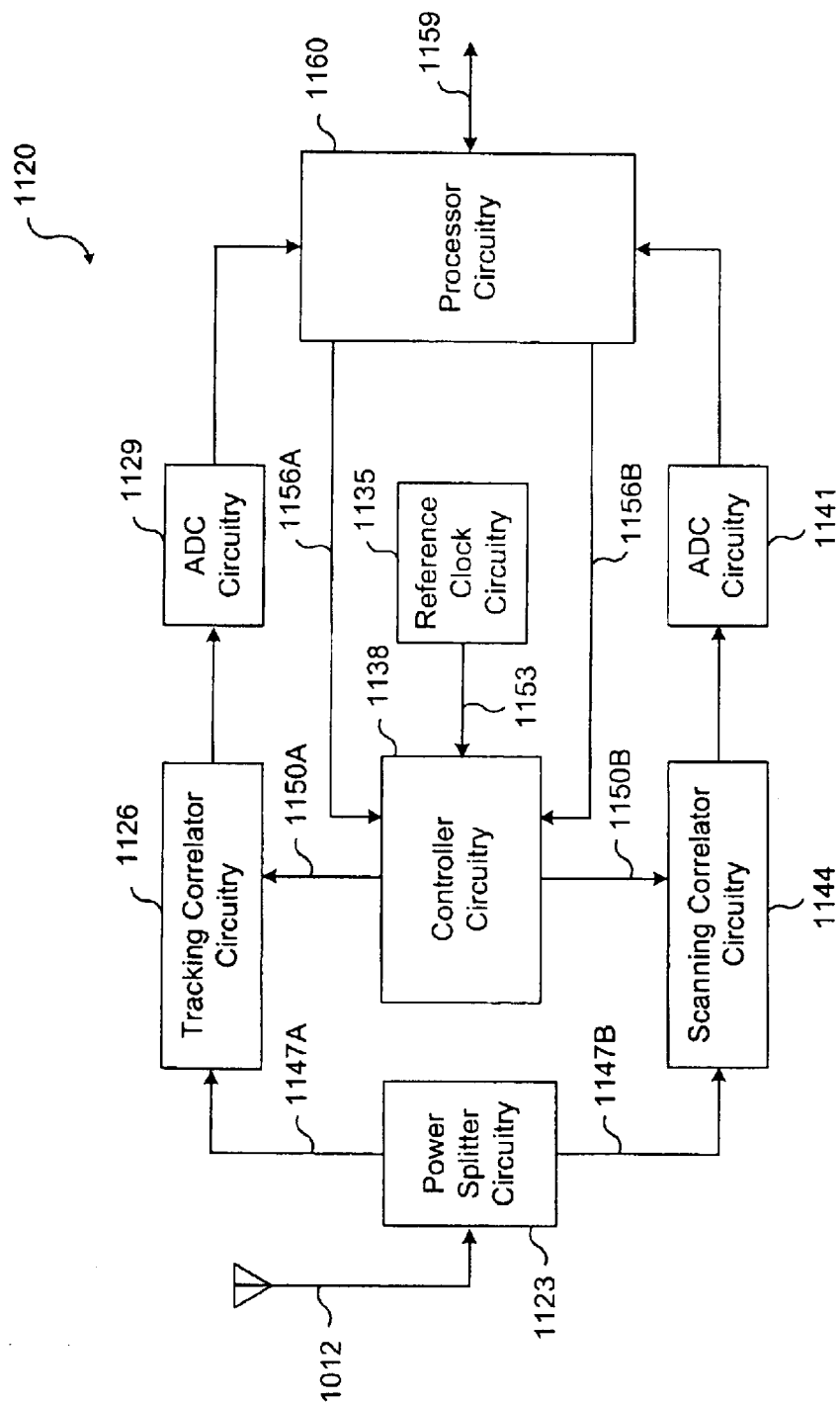
FIG. 17 shows a multiple-correlator receiver, or scanning receiver circuitry that comprises a tracking correlator circuitry and a scanning correlator circuitry.

FIG. 17 depicts a block diagram of a scanning receiver comprising two correlators 1126 and 1144, controlled by a controller circuitry 1138. Note, however, that one may use any number of correlators, as desired. One of the correlators is a tracking correlator 1126, which varies the phase of its internal coded template until it synchronizes with and is able to track the received pulse train. Any offset between the transmitted pulse repetition frequency and the receiver's internal pulse repetition frequency is detected as an error voltage in the correlation lock loop. Correlation lock loop as used in TM-UWB is described fully in U.S. Pat. No. 5,832,035, entitled, "Fast Locking Mechanism for Channelized Ultrawide-Band Communications," and is incorporated in its entirety herein by reference. Correlation Lock loop provides for acquisition and lock of an impulse radio signal. Further, commonly owned U.S. patent application, entitled, "System for Fast Lock and Acquisition of Ultra-Wideband Signals," Ser. No. 09/538,292, describes the most current methodologies for acquisition and fast lock and, again, is incorporated in its entirety here by reference.

The error in the correlation lock loop is corrected by synthesizing a frequency offset by the controller circuitry 1138. This adjustment ensures the receiver's clock is within approximately 20 ps RMS of the received signal. Once the tracking correlator 1126 is synchronized and locked to the incoming signal, the scanning correlator 1144 may sample the received waveform at precise time delays relative to the tracking point. By successively increasing the time delay while sampling the waveform, a complete, time-calibrated picture of the waveform can be collected. Also, the scanning correlator 1144 may scan prior to the tracking correlator, thus the tracking correlator will be delayed in respect to the scanning correlator. At the same time that waveform data is being captured, samples from the tracking correlator 1126 are also being collected. Samples from the scanning correlator 1144 and tracking correlator 1126 are collected in pairs so that events in the waveform sample set are time correlated with events in the data symbol set.

Functionally, and specifically in this embodiment, the incoming impulse RF signal is received via ultra-wideband antenna 1012. The signal is split in power splitter 1123, thereby being split among the designed number of correlators. The embodiment shown in FIG. 17 uses two correlators (tracking correlator 1126 and scanning correlator 1144). The tracking correlator 1126 and the scanning correlator 1144 are triggered by the controller circuitry 1138, using a reference clock circuitry 1135. In exemplary embodiments, the scanning receiver saves the scanned data points for farther processing, for example, by the correlator circuitry of the FAP detector circuitry, as described below.

The output of the tracking correlator 1126 passes to analog-to-digital converter circuitry 1129 with the digital signal passing to processor circuitry 1160. The scanning correlator 1144 output also passes to analog-to-digital converter 1141 for input into the processor circuitry 1160. The processor circuitry 1160 may comprise a DSP, and performs signal processing on the signals it receives, as desired. For further details regarding scanning receivers, see commonly assigned U.S. patent application Ser. No. 09/537,264, filed on Mar. 29, 2000, and incorporated here in its entirety by reference.

Figure 18:
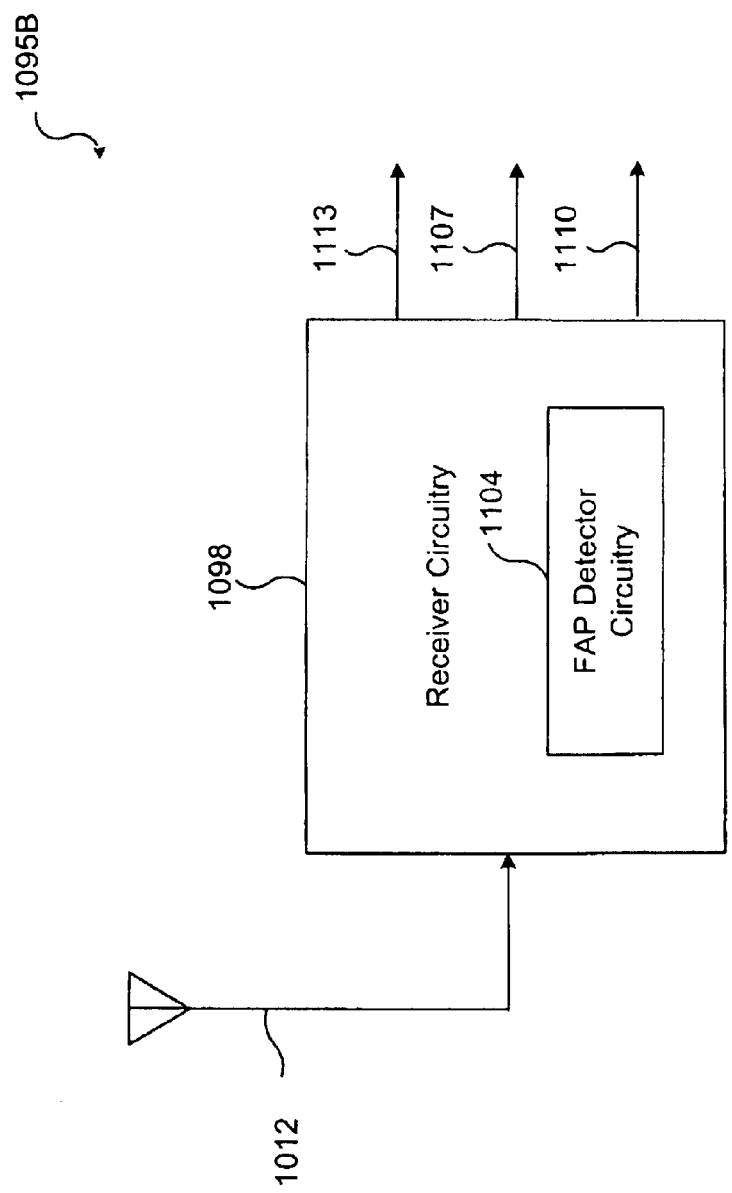
FIG. 18 depicts a receiver circuitry that includes FAP detector circuitry according to the invention.

FIG. 18 shows a block diagram 1095B of a receiver circuitry 1098 that includes a FAP detector circuitry 1104 according to the invention. Unlike the arrangement shown in FIG. 16, the FAP detector circuitry 1104 in FIG. 18 resides within the receiver circuitry 1098. Inclusion of the FAP detector circuitry 1104 within the receiver circuitry 1098 may allow circuit economies, or may allow more integration, as desired. The receiver circuitry 1098 provides a signal or set of signals 1107 and a signal or set of signals 1110 that serve a similar function as in FIG. 16. The receiver circuitry may also provide a signal or set of signals 1113 for interfacing to a processor circuitry (not shown in FIG. 18). The processor circuitry may comprise a DSP and may process signals that the receiver circuitry 1098 provides, as desired.

Figure 19:
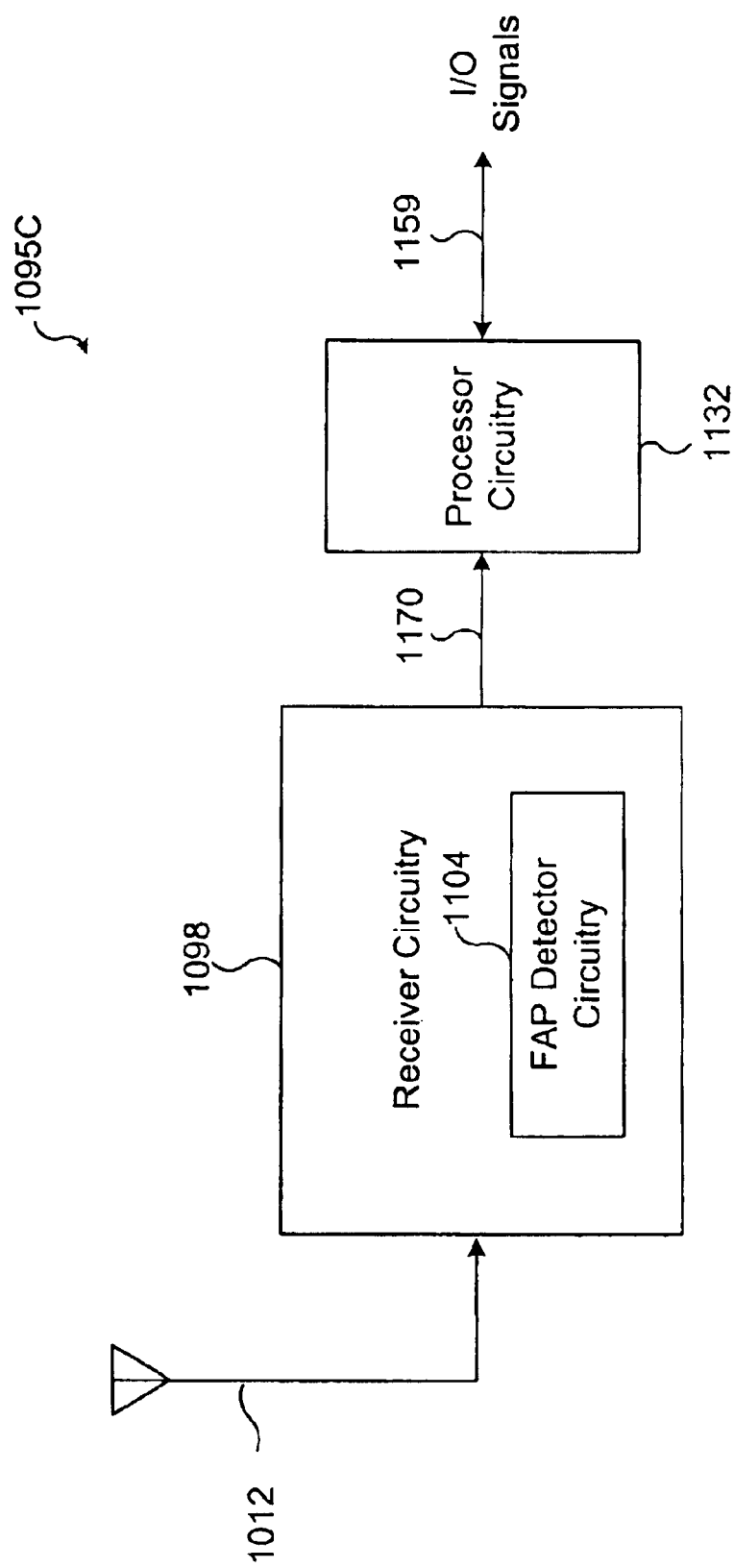
FIG. 19 illustrates a receiver circuitry that includes FAP detector circuitry according to the invention, which couples to a processor circuitry.

FIG. 19 illustrates a block diagram 1095C of a receiver circuitry 1098 that includes a FAP detector circuitry 1104 according to the invention. The receiver circuitry 1098 communicates with a processor circuitry 1132 through an interface 1170. The interface 1170 may include a plurality of signal lines to permit the receiver circuitry 1098, the FAP detector circuitry 1104, or both, to exchange data with the processor circuitry 1132. The processor circuitry 1132 may comprise a DSP or other type of processor, as desired.

The processor circuitry 1132 may process signals received from the receiver circuitry 1098, the FAP detector circuitry 1104, or both, as desired. For example, the processor circuitry 1132 may demodulate signals, perform filtering or reconstruction operations on signals, or perform computational operations on the signals it receives. The processor circuitry 1132 may communicate with external circuitry (not shown explicitly) through a set of input/output (I/O) lines 1159. The external circuitry may include, for example, a computer system, a network system, or communication equipment, input circuitry, output circuitry, storage circuitry, or the like, as desired.

Figure 20:
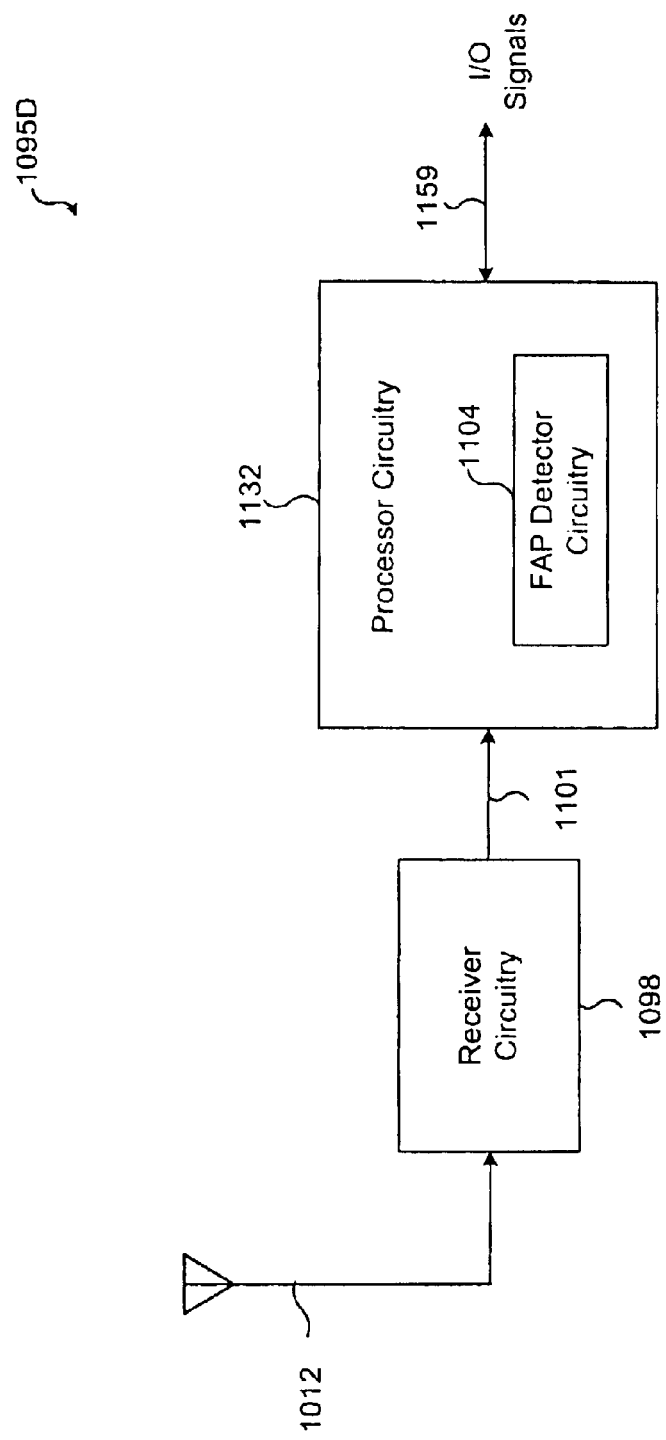
FIG. 20 shows receiver circuitry that couples to a processor circuitry that comprises a FAP detector circuitry according to the invention.

FIG. 20 shows a block diagram 1095D of a receiver circuitry 1098 that communicates with a processor circuitry 1132 through a link 1101. The processor circuitry 1132 includes a FAP detector circuitry 1104. Thus, rather than residing in the receiver circuitry 1098, the FAP detector circuitry 1104 resides in the processor circuitry 1132. The processor circuitry 1132 may comprise a DSP or other type of processor, as desired. The processor circuitry 1132 may process signals received from the receiver circuitry 1098, as desired. For example, the processor circuitry 1132 may demodulate signals, perform filtering or reconstruction operations on signals, or perform computational operations on the signals it receives. The processor circuitry 1132 may communicate with external circuitry (not shown explicitly) through a set of input/output (I/O) lines 1159. The external circuitry may include, for example, a computer system, a network system, or communication equipment, input circuitry, output circuitry, storage circuitry, or the like, as desired. To detect a first-arriving pulse, the FAP detector circuitry 1104 operates on signals it receives from the receiver circuitry 1098 via the link 1101.

Figure 21:
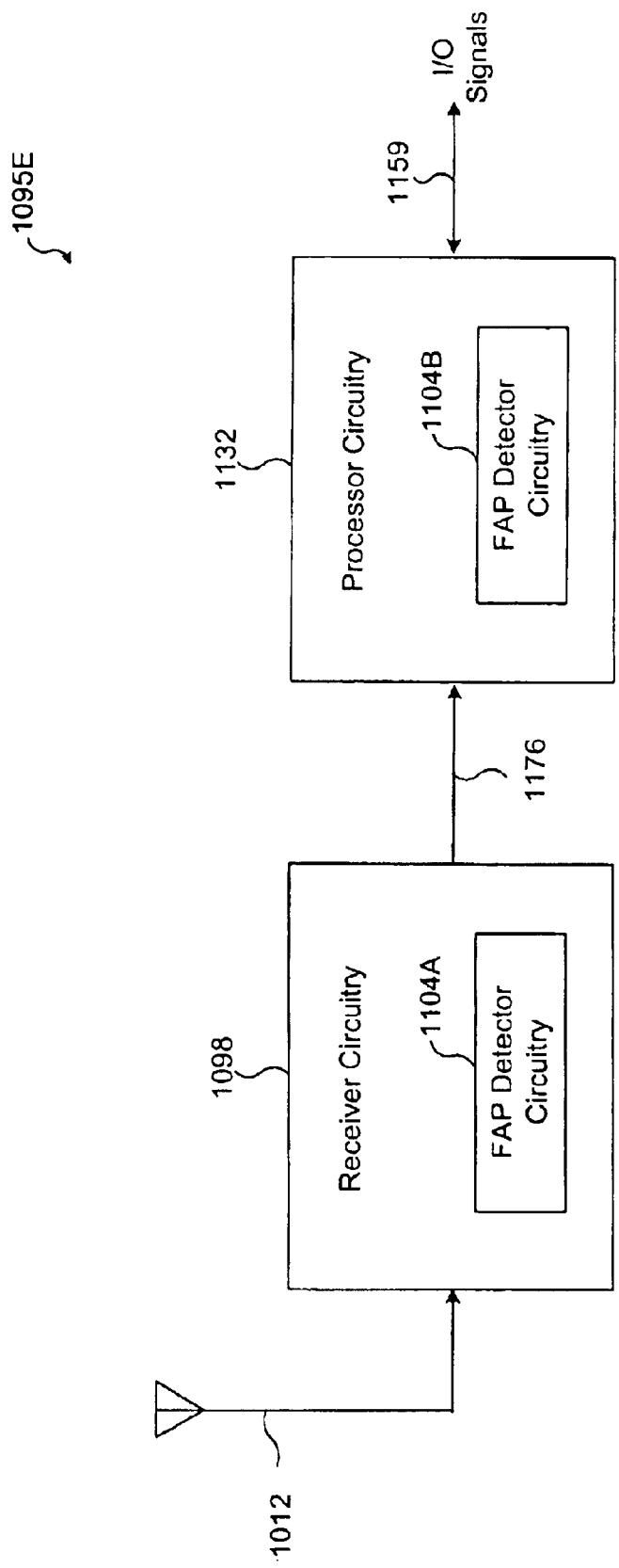
FIG. 21 depicts a receiver circuitry that couples to a processor circuitry, wherein the receiver circuitry and the processor circuitry contain FAP detector circuitry according to the invention.

FIG. 21 shows a block diagram 1095E of a receiver circuitry 1098 that communicates with a processor circuitry 1132 via an interface 1176. The processor circuitry 1132 may comprise a DSP or other type of processor. The processor circuitry 1132 may process signals received from the receiver circuitry 1098, as desired. For example, the processor circuitry 1132 may demodulate signals, perform filtering or reconstruction operations on signals, or perform computational operations on the signals it receives, as desired. The processor circuitry 1132 may communicate with external circuitry (not shown explicitly) through a set of input/output (I/O) lines 1159. The external circuitry may include, for example, a computer system, a network system, or communication equipment, input circuitry, output circuitry, storage circuitry, or the like, as desired.

The receiver circuitry 1098 includes a FAP detector circuitry 1104A. The processor circuitry 1132 also includes a FAP detector circuitry 1104B. The FAP detector circuitry 1104A and the FAP detector circuitry 1104B may include all or part of the functionality and circuitry of a FAP detector circuitry according to the invention, as desired. The choice of including full or partial functionality and circuitry of a FAP detector circuitry depends on application and system design considerations, as a person of ordinary skill in the art would understand.

The receiver circuitry 1098 and the processor circuitry 1132 may each include a FAP detector circuitry 1104 according to the invention. In other words, the FAP detector circuitry 1104A and the FAP detector circuitry 1104B include all or substantially all of the functionality, circuitry, or both, of a FAP detector circuitry according to the invention. In this case, each of the FAP detector circuitries 1104A and 1104B operate on the received signals. For example, the two FAP detector circuitries 1104A and 1104B may operate in a multiplexed manner, processing alternate frames of received data. As another example, the two FAP detector circuitries 1104A and 1104B may operate in a parallel manner.

Alternatively, the receiver circuitry 1098 and the processor circuitry 1132 may each include less than the full functionality, circuitry, or both, of a FAP detector circuitry according to the invention. Put another way, the FAP detector circuitry 1104A and the FAP detector circuitry 1104B may include less than all of the functionality, circuitry, or both, of a FAP detector circuitry according to the invention. Here, the FAP detector circuitry 1104A may perform some of the operations involved in detecting a first-arriving pulse while the FAP detector circuitry 1104B may perform other operations involved in detecting a first-arriving pulse, as desired. Thus, the FAP detector circuitries 1104A and 1104B may coordinate between them the detection of a first-arriving pulse. The processor circuitry 1132, the receiver circuitry 1098, or both, may supervise the operations as desired, depending on a particular application.

Figure 22:
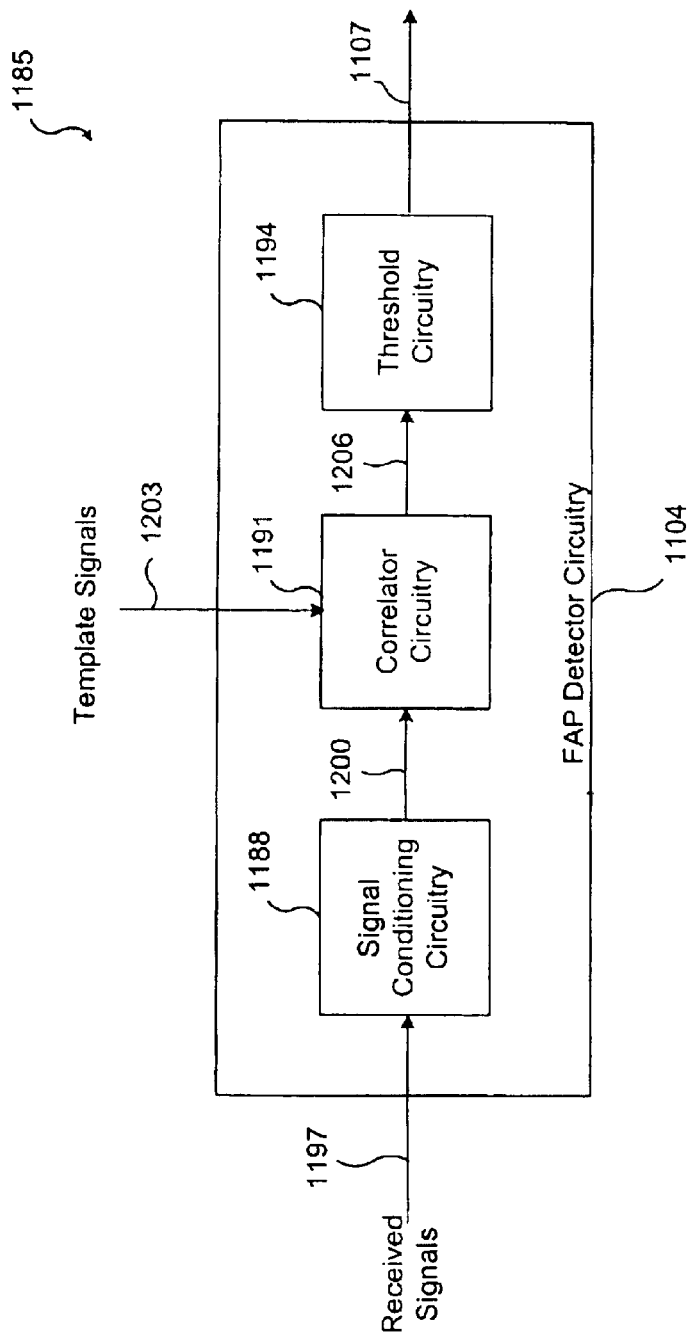
FIG. 22 illustrates one embodiment of a FAP detector circuitry according to the invention, which includes a correlator circuitry and a threshold circuitry and, optionally, a signal-conditioning circuitry.

FIG. 22 shows a block diagram of an embodiment 1185 of a FAP detector circuitry 1104 according to the invention. The FAP detector circuitry 1104 comprises a correlator circuitry 1191 and a threshold circuitry 1194. One may optionally include within the FAP detector circuitry 1104 a signal conditioning circuitry 1188. The signal conditioning circuitry may perform signal processing functions on a received signal 1197, as desired. The signal processing operations may include, for example, filtering, specialized signal processing, signal reconstruction, and the like. In exemplary embodiments, the received signal 1197 comprises an ultra-wideband RF signal that the scanning receiver circuitry of FIG. 17 has received and processed, as described above.

Note that, although FIG. 22 includes the signal conditioning circuitry 1188 within the FAP detector circuitry 1104, one may include the signal conditioning circuitry 1188, or its functionality, or both, in other locations, as desired. For example, one may include the signal conditioning circuitry 1188 or its functionality in a processor circuitry, such as a DSP. One may alternatively include the signal conditioning circuitry 1188 or its functionality in a receiver circuitry, such as the scanning receiver circuitry shown in FIG. 17.

The correlator circuitry receives an input signal 1200. The input signal 1200 may comprise an RF signal as received and processed by a receiver circuitry, for example, the scanning receiver circuitry shown in FIG. 17. The input signal 1200 may alternatively comprise the signal provided by the receiver circuitry, as further processed the optional signal conditioning circuitry 1188. In either case, the input signal 1200 includes data frames corresponding to the received RF signal. In exemplary embodiments, the input signal comprises data frames corresponding to the received ultra-wideband RF signals that the scanning receiver circuitry shown in FIG. 17 provides. The input signal 1200 may also represent a noise floor of the communication link or channel before the receiver circuitry has locked onto, or acquired, a transmitted signal. FAP detector circuitries according to the invention use information derived from the noise floor to detect the FAP, as described below in detail.

Figure 24:
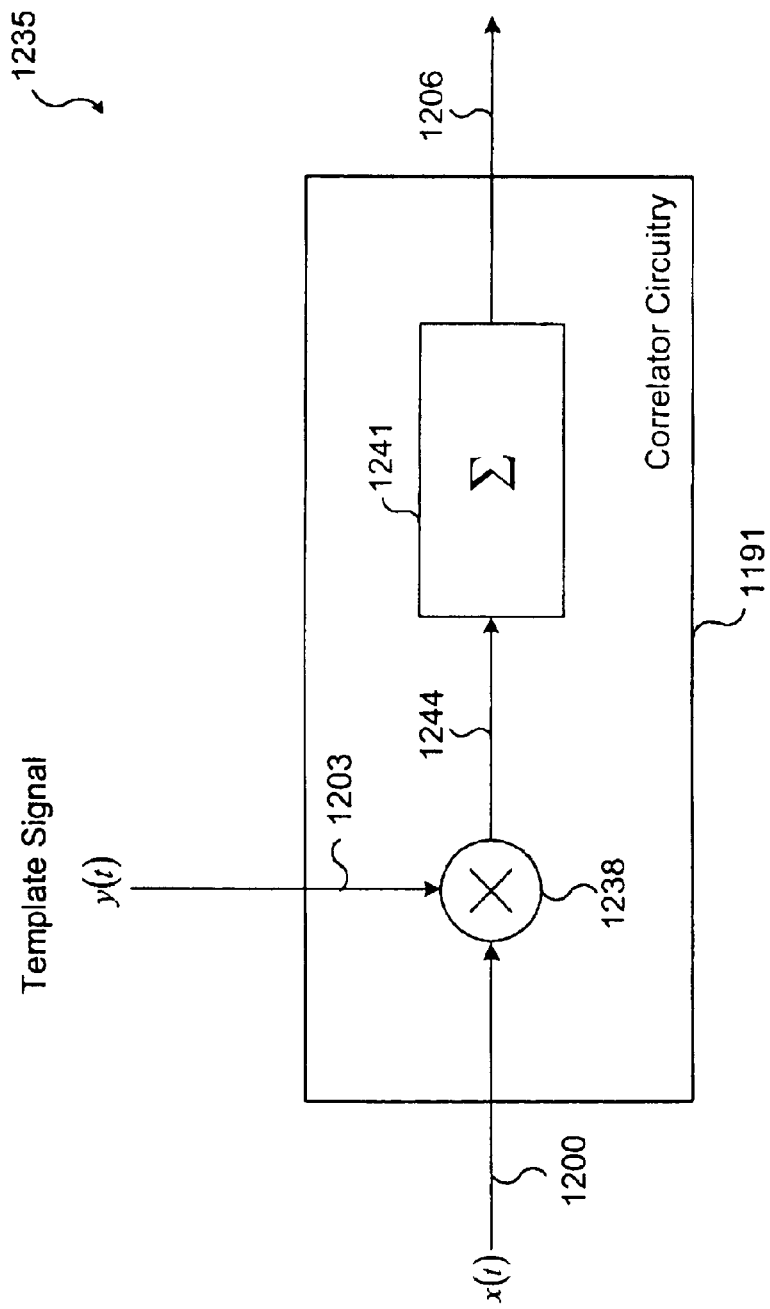
FIG. 24 depicts one embodiment of a correlator circuitry that a FAP detector circuitry according to the invention may use.
Figure 25:
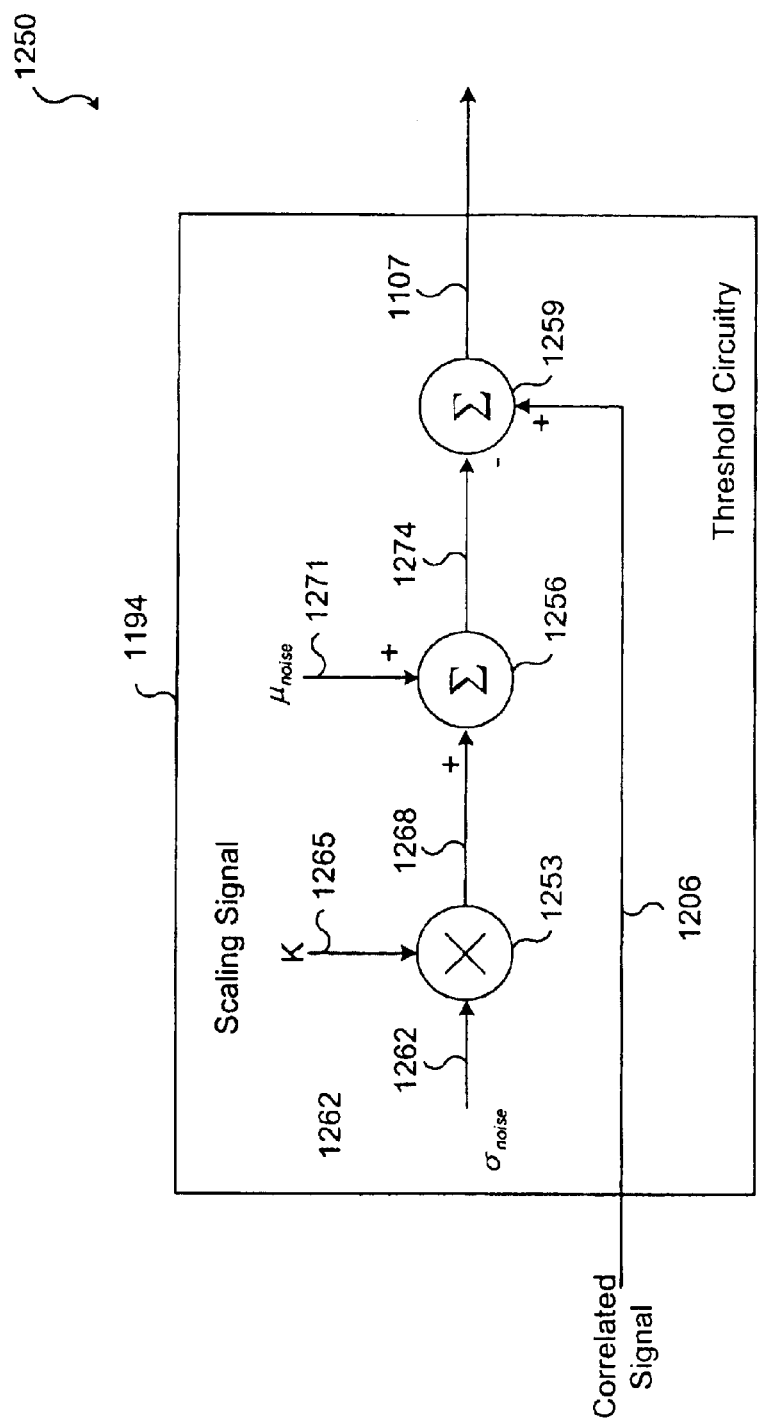
FIG. 25 illustrates one embodiment of a threshold circuitry that FAP detector circuitry according to the invention may use.

The correlator circuitry 1191 performs a correlation operation on the input signal 1200 and a template signal 1203. The correlator circuitry 1191 provides a correlated output signal 1206 to the threshold circuitry 1194. The threshold circuitry in turn supplies a signal or set of signals 1107 that includes information about the first-arriving pulse in the received RF signal. FIGS. 24 and 25 and their accompanying discussions below provide more details about the correlator circuitry 1191 and the threshold circuitry 1194, respectively.

Figure 23:
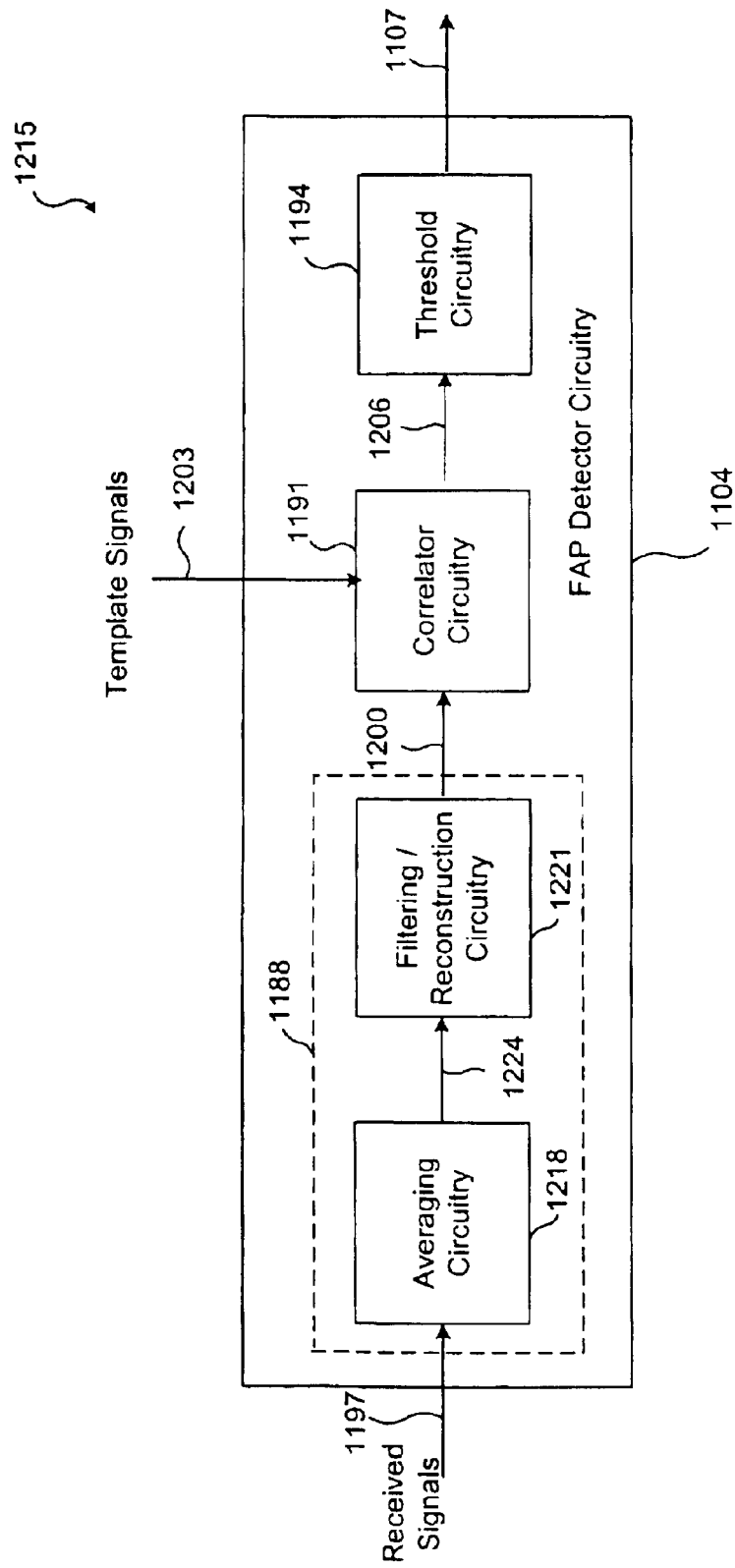
FIG. 23 shows more details of an embodiment of a FAP detector circuitry according to the invention, which includes a correlator circuitry and a threshold circuitry and, optionally, a signal-conditioning circuitry.

FIG. 23 shows another embodiment 1215 of a FAP detector circuitry 1104 according to the invention. The embodiment 1215 includes a correlator circuitry 1191, a threshold circuitry 1194, and an optional signal conditioning circuitry 1188. These components operate similarly to those described above in connection with FIG. 22. FIG. 23, however, shows more details of the optional signal conditioning circuitry 1188. The signal conditioning circuitry comprises an averaging circuitry 1218 and a filtering/reconstruction circuitry 1221.

The averaging circuitry 1218 performs averaging operations on the received signals 1197. Rather than residing within the signal conditioning circuitry 1188, the averaging circuitry 1218, its functionality, or both, may reside in other locations, for example, within the scanning receiver circuitry shown in FIG. 17. The filtering/reconstruction circuitry 1221 may perform signal processing operations, for example, filtering operations on the data signals.

FIG. 24 shows an embodiment 1235 of the correlator circuitry 1191. The correlator circuitry includes a multiplier circuitry 1238 and a summation circuitry 1241. The correlator circuitry 1191 performs the well-known correlation operation $$R(t) = x(n) * y(n) = \sum_{k=0}^{N-1} X(k) \cdot Y(N-k),$$

where x(n) and y(n) represent the input signal 1200 and the template signal 1203, respectively, N represents the number of samples in the signals x(n) and y(n), and R(t) represents the correlated signal.

Note that one may combine into one process the filtering and correlation processes described above. For example, a linear band-pass filter and correlation yields a single transfer function given by $$H_{new}(\omega) = H_{BP}(\omega) \cdot H_{corr}(\omega),$$

where $H_{new}(\omega)$, $H_{BP}(\omega)$, and $H_{corr}(\omega)$ represent the new transfer function, the band-pass transfer function, and the correlation transfer functions, respectively.

The filtering and correlation processes serve to increase the signal-to-noise ratio so as to facilitate more efficient detection of the signal. One may consider this approach in terms of system characterization where one determines the system transfer function by convolution. Given the transmitted signal and the received signals, having spectra denoted as $H_t(\omega)$ and $H_r(\omega)$, respectively, one may derive the system transfer function as $$H(\omega) = \frac{H_r(\omega)}{H_t(\omega)}.$$

The acquisition point of the transmit and receive signals determine the definition of the system, as characterized by $H(\omega)$. One may term this technique de-convolution or inverse-filtering. As persons of ordinary skill in the art will understand, one may implement this concept in through analog, digital, or mixed-mode mechanisms. Moreover, one may implement this concept through non-linear mechanisms, such as non-linear filters, artificial neural networks, fuzzy logic, etc. Note that FIG. 24 depicts a conceptual embodiment of the correlator circuitry 1191, and one may realize its functionality in a variety of different ways, for example, using hardware, software, or a combination of hardware and software, as desired.

The decision criteria follow the above process to determine the actual position of the FAP. The best design criterion depends on the overall system characteristics, such as the multipath environment, the characteristics of the transmission and reception implementations, and the like. A threshold signal based on the signal strength and the noise floor has proven effective in detecting the FAP, as described below in more detail.

FIG. 25 illustrates an embodiment 1250 of the threshold circuitry 1194. The threshold circuitry 1194 comprises a multiplier circuitry 1253, a summing circuitry 1256, and a final summing circuitry 1259. The multiplier circuitry 1253 receives a standard-deviation signal 1262, $\sigma_{noise}$, and a signal 1265 that corresponds to a scaling factor, K, and produces a product signal 1268. The standard-deviation signal 1262 comprises the standard deviation of a noise floor of the received signal, as received, or with further processing, as described in more detail below. The summing circuitry 1256 receives the product signal 1268 and a mean signal 1271, $\mu_{noise}$, and produces an output signal 1274. The mean signal 1268 comprises the average of the noise floor of the of the communication link or of the received signal, as received, or with further processing, as described in more detail below. In effect, the threshold circuitry 1194 calculates the threshold value as $$T = \mu_{noise} + K \cdot \sigma_{noise},$$

where T represents the threshold signal.

The final summing circuitry 1259 accepts both the output signal 1274 of the summing circuitry 1256 and the output signal 1206 of the correlator circuitry 1191 and provides as its output signal 1107 the difference between them (i.e., it subtracts the output signal 1274 of the summing circuitry 1256 from the output signal 1206 of the correlator circuitry 1191). Note that FIG. 25 depicts a conceptual embodiment of the threshold circuitry 1194, and one may realize the same functionality in a variety of different ways, for example, using hardware, software, or a combination of hardware and software, as desired. Furthermore, as noted above, one may use digital or analog realizations of the correlator circuitry 1191, as desired.

Figure 26:
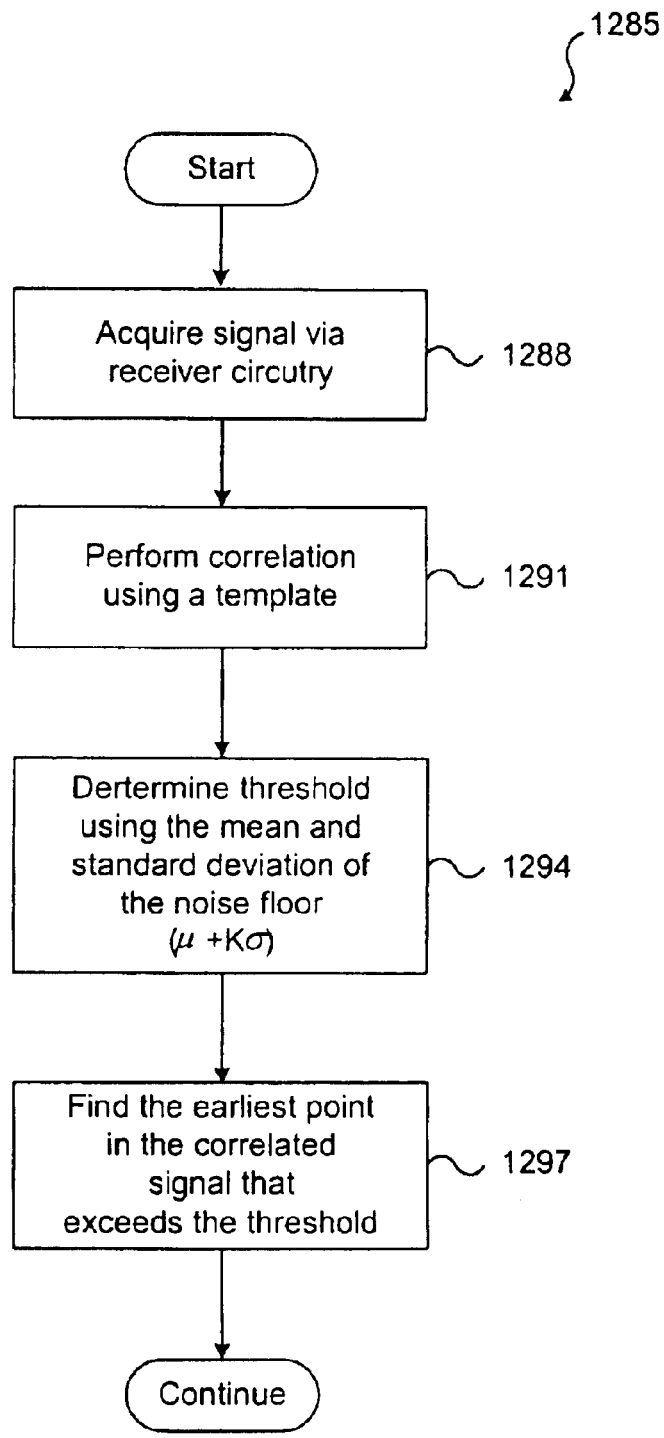
FIG. 26 shows a flowchart that shows generally the steps that a FAP detector circuitry according to the invention performs.

FIG. 26 shows a flowchart 1285 of operations that a FAP detector circuitry according to the invention performs. The operations begin at step 1288. In that step, a receiver circuitry acquires an RF signal. In exemplary embodiments, the receiver circuitry comprises a scanning receiver circuitry, and the received RF signal comprises an ultra-wideband signal. The FAP detector circuitry thereafter performs a correlation of the received signal or a data frame (a set of numeral data values) that corresponds to the received signal and a template signal in step 1291. The FAP detector circuitry then determines a threshold, $T = \mu_{noise} + K \cdot \sigma_{noise}$, in step 1294. Finally, in step 1297, the FAP detector circuitry according to the invention determines the earliest point in the correlated signal that exceeds the threshold, T. That point corresponds to the position of the first-arriving signal. The FAP detector circuitry according to the invention may repeat the steps shown in FIG. 26 to determine and update the first-arriving pulse, as desired, for example, in response to new received signals.

Figure 27:
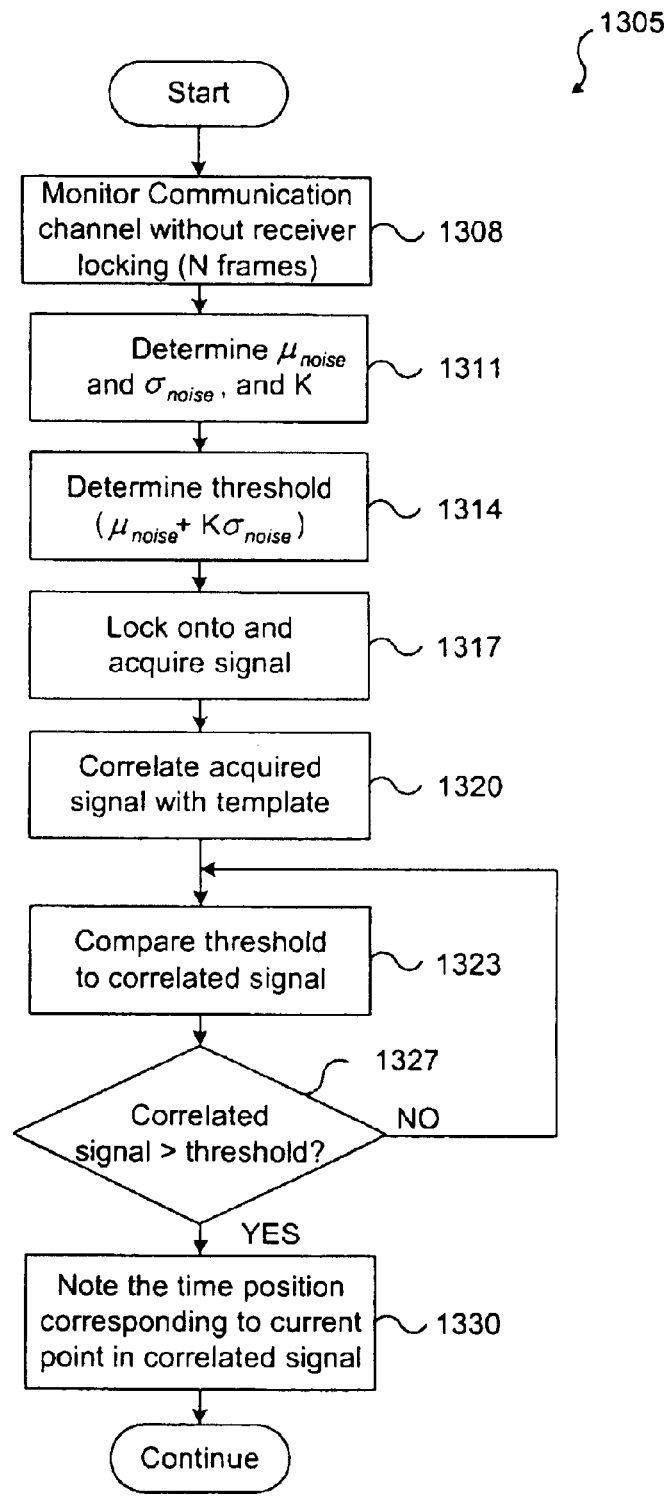
FIG. 27 depicts a flowchart that shows more detailed steps that a FAP detector circuitry according to the invention performs.

FIG. 27 illustrates a more detailed flowchart 1305 of the operations that another embodiment of a PAP detector circuitry according to the invention performs. In step 1308, the FAP detector circuitry or a receiver circuitry monitors the communication channel and acquires N frames of data. Each frame of data may correspond to a received signal, e.g., a first-arriving pulse and a plurality of pulses that result from its transmission in a multipath environment. In exemplary embodiments, the number of frames, N, is 1,000. The number of frames, N, however, depends on various factors, for example, speed of hardware, software, or both, the desired performance, and the like, as persons skilled in the art would understand. One may therefore use other numbers of frames, as desired.

Next, in step 1311, the FAP detector circuitry calculates $\mu_{noise}$ and $\sigma_{noise}$. In this step, the FAP detector circuitry may also calculate or accept as an input a scaling factor, K. The FAP detector circuitry then determines a threshold value, $T = \mu_{noise} + K \cdot \sigma_{noise}$, in step 1314. In the next step, step 1317, the receiver circuitry locks onto the transmitter's signal and acquires a signal. The FAP detector circuitry then correlates the acquired signal with the template signal in step 1320 to produce a correlated signal. Next, the FAP detector circuitry compares the correlated signal with the threshold signal in step 1323. Note that, because the correlated signal results from the correlation operation on a received data frame, e.g., a data frame received by the scanning receiver circuitry shown in FIG. 17, the comparison takes place on a data point by data point basis. As an example, the FAP detector circuitry may perform this operation by using a pointer to address the points within the received data frame and within the correlated signal, as persons skilled in the art would understand.

The FAP detector circuitry makes a decision based on the results of the comparison, as shown in step 1327. If the results of the comparison show that the current data point in the correlated signal exceeds the threshold signal, the FAP detector circuitry notes the time position in the data frame as the position of the first-arriving pulse, as step 1330 indicates. If, however, the current data point (i.e., the data point selected for the compare operation in step 1323) in the correlated signal does not exceed the threshold signal, the FAP detector circuitry proceeds to compare the next data point in the correlated signal with the threshold signal. In other words, the FAP detector circuitry returns to step 1323 and prepares to compare the next data point in the correlated signal with the threshold signal. Note that, although FIG. 27 does not explicitly show it, the FAP detector circuitry may repeat steps 1317 through 1330 repeatedly for additional received signals, as desired. Depending on the particular implementation, however, the circuitry may not have to lock onto the transmitted signal repeatedly, as persons skilled in the art would understand.

FAP detector circuitries according to the invention use the mean (average) and standard deviation of a noise floor of the communication link or of the received signal to detect the first-arriving pulse. Before the receiver circuitry locks onto and acquires a transmitted signal, it receives noise present within the communication link. In exemplary embodiments, FAP detector circuitries use attributes of that noise floor, specifically, its mean and standard deviation, to calculate a threshold and detect the FAP accordingly. To improve its detection operation, the FAP detector circuitry may update the threshold signal dynamically. Periodically, the FAP detector circuitry may calculate a new noise standard deviation, $\sigma_{noise}$, and a new noise mean, $\mu_{noise}$, and therefore calculate a new value for the threshold signal, $T=\mu_{noise}+K\cdot\sigma_{noise}$, using the new values of $\sigma_{noise}$ and $\mu_{noise}$. For example, the FAP detector circuitry may update the threshold signal after acquiring each data frame that corresponds to a new received signal. Alternatively, the FAP detector circuitry may update the threshold signal after acquiring a number of data frames, as desired. During this dynamic updating process, the FAP detector circuitry may use a new value of the scaling factor, K, as desired. In other words, the FAP detector circuitry starts with an initial threshold calculated from the noise floor of the communication link and dynamically updates the threshold value after a transmitted signal has been acquired.

Figure 28:
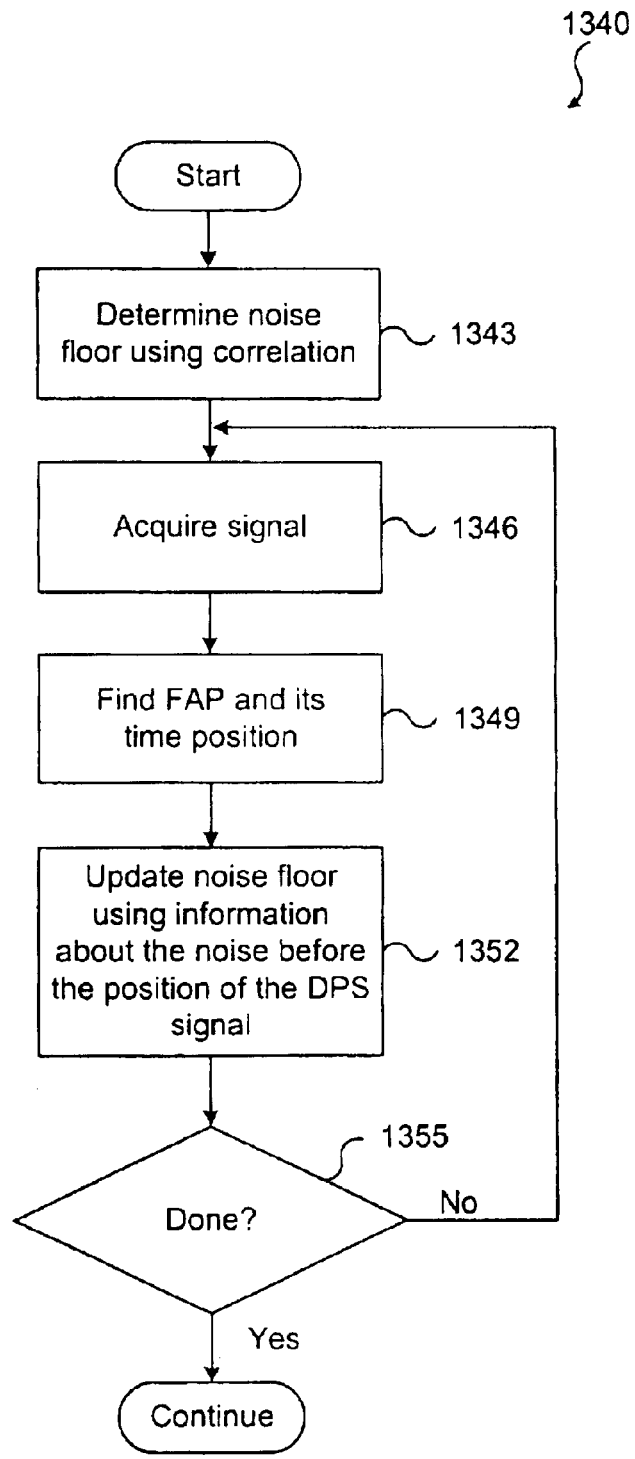
FIG. 28 illustrates a flowchart that shows generally the steps for dynamically updating the threshold signal in a FAP detector circuitry according to the invention.

FIG. 28 shows a flowchart 1340 that shows the operational steps for dynamic updating of the threshold signal. In step 1343, the FAP detector circuitry determines a noise floor and calculates values for $\sigma_{noise}$ and $\mu_{noise}$, using the operations outlined above in connection with FIG. 27 (see steps 1308 through 1314). Then, in step 1346, the FAP detector circuitry acquires a data frame corresponding to a received signal. Subsequently, in step 1349, the FAP detector circuitry determines the first-arriving pulse, its time position, or both, using a threshold signal, as noted above. Once it has identified the first-arriving pulse, the FAP detector circuitry may use the data points preceding the first-arriving pulse to calculate new values for $\sigma_{noise}$ and $\mu_{noise}$. In other words, the FAP detector circuitry uses the data points corresponding to the noise preceding the first-arriving pulse to update the noise standard deviation and mean. Next, as step 1355 depicts, the FAP detector circuitry may repeatedly acquire a new data frame and perform the threshold updating, ad desired.

A FAP detector circuitry according to another embodiment of the invention can determine the position of a first-arriving pulse with improved precision. In this embodiment, the FAP detector circuitry identifies the peak in the correlated signal that corresponds to the first-arriving pulse. Typically, the point in time when the correlated signal exceeds the threshold signal occurs on a leading edge of the first-arriving pulse. Rather than identifying the leading edge of the first-arriving pulse, this embodiment of the FAP detector circuitry selects the peak of the first-arriving pulse, and the time corresponding to that peak, if desired. In this manner, this embodiment of the invention identifies the first-arriving pulse itself, rather than its leading edge.

Figure 29:
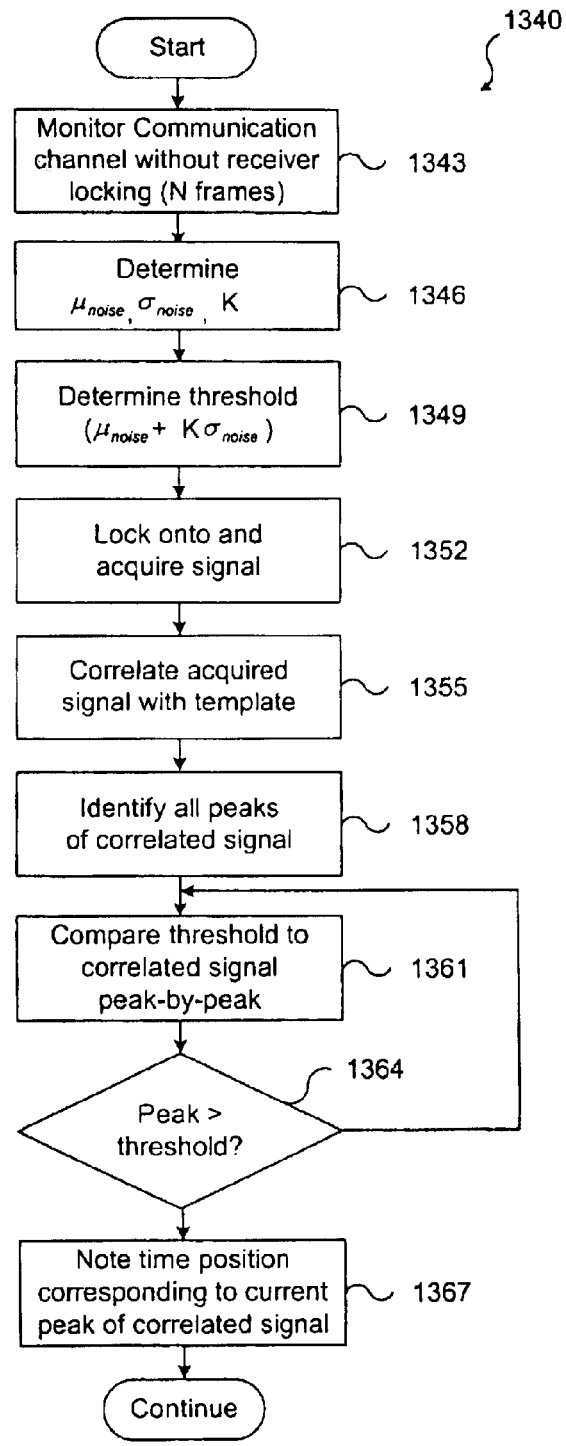
FIG. 29 shows a flowchart that shows generally the steps for a more precise technique for detecting first-arriving-pulses according to the invention.

FIG. 29 shows a flowchart 1340 that corresponds to this embodiment of the invention. Steps 1343 through 1355 of the flowchart in FIG. 29 are similar to steps 1308 through 1320 of FIG. 27. Thus, in step 1343, the FAP detector circuitry or a receiver circuitry monitors the communication channel and acquires N frames of data. Each frame of data may correspond to a received signal, e.g., a first-arriving pulse and a plurality of pulses that result from its transmission in a multipath environment. In exemplary embodiments, the number of frames, N, is 1,000 The number of frames, N, however, depends on various factors, for example, the speed of hardware, software, or both, the desired performance, and the like, as persons skilled in the art would understand.

Next, in step 1346, the FAP detector circuitry calculates $\mu_{noise}$ and $\sigma_{noise}$. In this step, the FAP detector may also calculate or accept as an input a scaling factor, K. The FAP detector circuitry then determines a threshold value, $T=\mu_{noise}+K\cdot\sigma_{noise}$, in step 1349. In the next step, step 1352, the receiver circuitry locks onto the transmitter's signal and acquires a signal. The FAP detector circuitry then correlates the acquired signal with the template signal in step 1355 to produce a correlated signal.

Subsequently, in step 1358 the FAP detector circuitry according to this embodiment of the invention examines a data frame corresponding to the correlated signal and identifies all of the signal peaks in the data. One of the peaks corresponds to the first-arriving pulse. Next, in step 1361 the FAP detector circuitry compares the peaks of the correlated signal with a threshold signal. Note that, because the correlated signal results from the correlation operation on a received data frame, e.g., a data frame received by the scanning receiver circuitry shown in FIG. 17, the comparison takes place on a peak-by-peak basis. As an example, the FAP detector circuitry may perform this operation by using a pointer to address the points that correspond to the peaks within the correlated signal, as persons skilled in the art would understand.

The FAP detector circuitry makes a decision based on the results of the comparison, as shown in step 1364. If the results of the comparison show that the current peak in the correlated signal exceeds the threshold signal, the FAP detector circuitry notes the time position in the data frame as the position of the peak of the first-arriving pulse, as step 1367 indicates. If, however, the current peak (i.e., the peak selected for the compare operation in step 1361) in the correlated signal does not exceed the threshold signal, the FAP detector circuitry proceeds to compare the next peak in the correlated signal with the threshold signal. In other words, the FAP detector circuitry returns to step 1361 and prepares to compare the next peak in the correlated signal with the threshold signal. Note that, although FIG. 27 does not explicitly show it, the FAP detector circuitry may repeat steps 1352 through 1367 repeatedly for additional received signals, as desired. Depending on the particular implementation, however, the circuitry may not have to lock onto the transmitted signal repeatedly, as persons skilled in the art would understand.

Figure 30:
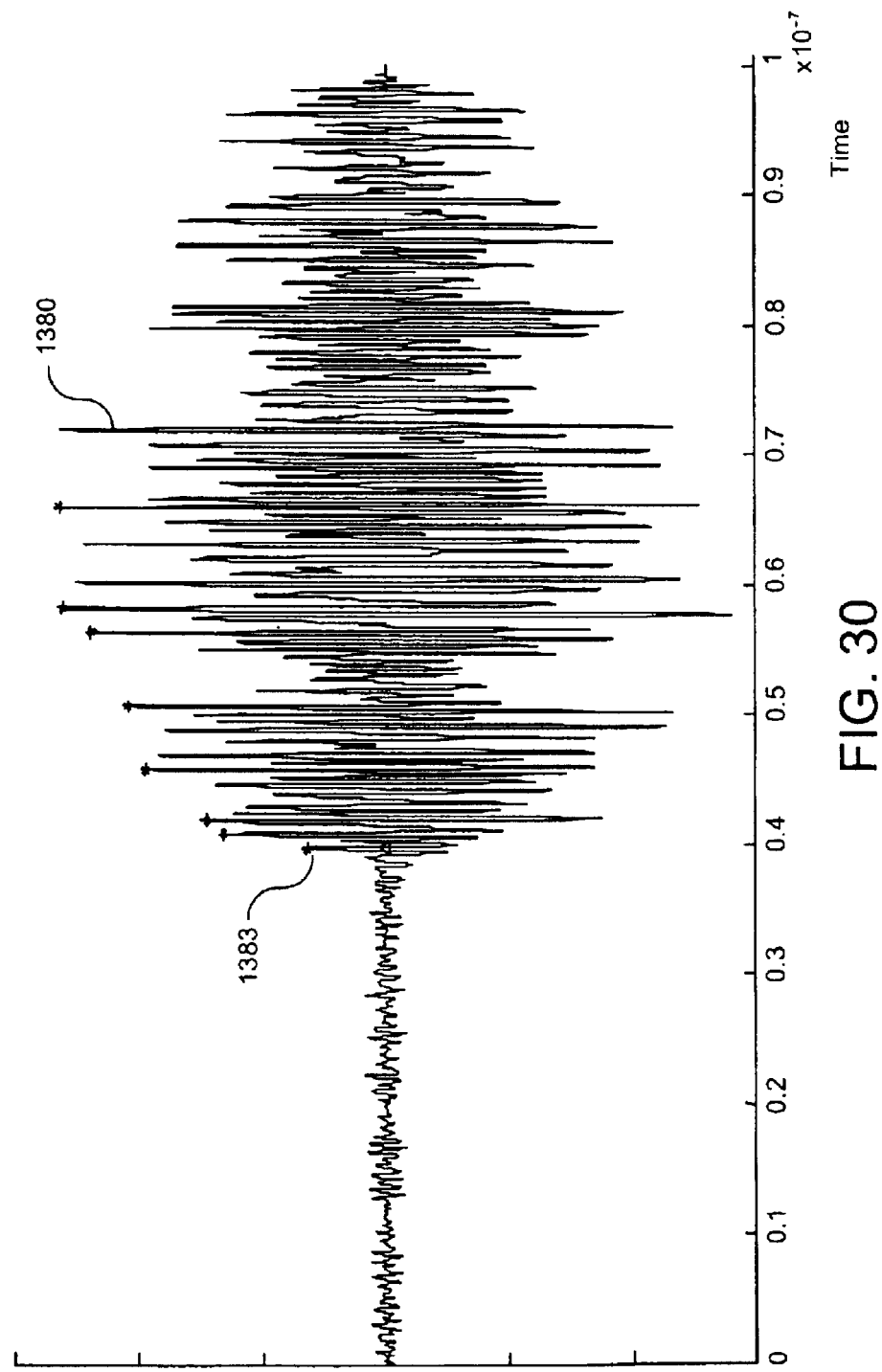
FIG. 30 depicts an example of a correlated signal in a FAP detector circuitry according to the invention.

FIG. 30 shows a plot of a typical waveform 1380 of a correlated signal obtained by a FAP detector circuitry according to the invention. The waveform 1380 resulted from the transmission of an ultra-wideband pulse in a multipath environment that included a plurality of objects or obstructions. The experimental setup included collecting propagation data by using an automated mobile platform with the location of the receiver antenna programmed to move in a predefined path. The setup allowed the medium between the transmitter circuitry and the receiver circuitry to change (e.g., from air to walls or other pertinent media). FIG. 30 represent a single data set at a given receiver position.

The waveform 1380 includes a first-arriving pulse 1383. The portion of the waveform 1380 that precedes the first-arriving pulse 1383 comprises noise, i.e., the noise floor of the waveform 1380. The pulses following the first-arriving pulse resulted from the interaction of the transmitted ultra-wideband pulse with the multipath environment. Note that the peak amplitudes of some of those pulses exceed the peak amplitude of the first-arriving pulse 1383.

FIGS. 31A–31C illustrate exemplary waveforms associated with the operation of a FAP detector circuitry according to the invention. The waveforms in FIGS. 31A–31C correspond to a transmission of an ultra-wideband pulse in a multipath environment that contained a plurality of objects or obstructions. The top plot, FIG. 31A, shows a waveform 1390 of an averaged received signal. The middle plot, FIG. 31B, shows a correlated signal obtained by a FAP detector circuitry according to the invention. The bottom plot, FIG. 31C, shows an expanded view of a portion of FIG. 31B to provide more details.

Referring to FIG. 31A, the averaging apparatus, in this case the receiver circuitry, obtained the waveform 1390 by averaging 1,000 received data frames. Note that the waveform 1390 includes a relatively substantial amount of noise in not only its noise floor (i.e., the part of the waveform preceding approximately $0.4 \times 10^{-7}$ on the horizontal time scale) but also in the signal portion of the waveform (i.e., the portion of the waveform from approximately $0.4 \times 10^{-7}$ to about $1.0 \times 10^{-7}$ on the horizontal scale).

FIG. 31B shows a waveform 1395 of a correlated signal that corresponds to the averaged signal in FIG. 31A. The waveform 1395 in FIG. 31B resulted from correlating the averaged signal of FIG. 31A with a template signal. The template signal in this case comprised a replica of the ultra-wideband pulse as received, obtained as described below. Note that, because of the correlation operation, the waveform 1395 in FIG. 31B has a relatively smaller level of noise than does the waveform 1390 in FIG. 31A. In other words, the correlation process lowers the level of the signals that are incoherent with the template signal. Because noise is incoherent with the template signal, the correlation process reduces the noise level. The noise floor of the waveform 1395 in FIG. 31B occupies the portion of the waveform 1395 that precedes approximately $0.4 \times 10^{-7}$ on the horizontal time scale.

FIG. 31C shows a waveform 1400 that comprises a portion of the waveform 1395 of FIG. 31B, but on an expanded horizontal time scale. The waveform 1400 depicts the part of the waveform 1395 of FIG. 31B that approximately occupies the range of $0.3 \times 10^{-7}$ to $0.5 \times 10^{-7}$ in FIG. 31B. The waveform 1400 includes a first-arriving pulse 1401. A triangle mark 1403 denotes the position of the first-arriving pulse. The position of the first-arriving pulse corresponds to a scaling factor, or K, of 3. The portion of the waveform 1400 that precedes the first-arriving pulse depicts in more detail the noise floor of the waveform 1395 in FIG. 31B.

The value of the threshold signal depends in part on the value one chooses for the scaling factor, K. Too small a value of K may result in an inaccurate identification of the first-arriving pulse. In other words, the FAP detector circuitry may incorrectly identify a fluctuation in the noise floor as the first-arriving pulse. On the other hand, selecting too large a value of K may result in the FAP detector circuitry to miss the true first-arriving pulse and, instead, pick another, later-arriving pulse, as the first-arriving pulse. Thus, selecting a proper value of K helps to ensure accurate detection of the first-arriving pulse.

As one option, one may select a proper value of the scaling factor, K, by characterizing the communication, ranging, or positioning system. Using this method, one may set up a transmitter and a receiver at a known distance. Next, one may select an initial value of K, say, K=1, and transmit and receive a plurality of pulses. One may then repeat the process, but with varying values of K, e.g., 2 or 3, and collect data regarding the performance of the FAP detector circuitry for each value of K. Knowing the distance, one knows when the first-arriving pulse should arrive, so one may characterize the performance of the system as a function of K.

After characterizing the system performance, one may select a suitable value of K based on the desired system performance specifications. In other words, by examining the results, one may select a value of K that causes the FAP detector circuitry to obtain a desired level of performance. Thus, one may select the value of K empirically for a given communication system and a given propagation environment. One may also employ statistical techniques to select a value of K. For example, one may assume that the noise has a Gaussian distribution, and select a value of K that results in successful detection of the first-arriving pulse a desired percentage of time, say, 99.99% of the time.

Successful detection of the first-arriving pulse also depends on selection of a suitable template signal. One may obtain the template signal in a number of ways. In exemplary embodiments, the template signal comprises a replica of the transmitted signal, as received via a suitable propagation environment and receiver antenna, and the transmitted signal constitutes an ultra-wideband pulse, i.e., a Gaussian monocycle. A receiver receives a Gaussian doublet in response to a transmitted Gaussian monocycle. In other words, a Gaussian monocycle transmitted to a receiver results in the receiver's circuitry receiving a Gaussian doublet.

In one technique for obtaining a template signal, one sets up a transmitter and a receiver in a propagation environment, which in exemplary embodiments constitutes an environment in which the transmitted signal need not propagate through walls or similar objects to reach the receiver. Put another way, the propagation environment includes a minimal number of objects or obstructions that may give rise to multipath effects. One would then transmit a pulse a number of times and average the received signal over time to obtain a template signal.

After obtaining a suitable template signal, one may store the template signal and use it in the FAP detector circuitry. For example, one may store the transmitted pulse in a storage medium, such as a hard drive, memory circuitry, or other similar component, within the receiver, the FAP detector circuitry, or other suitable location, as desired. As an alternative, particularly in radar applications, where the transmitter and receiver typically share part of the circuitry, one may store the template signal in a suitable storage medium, for example, within the shared circuitry or within the receiver circuitry or the transmitter circuitry.

Several options exist for storing the template signal for use in a FAP detector circuitry according to the invention. As one option, one may use a template signal that comprises a sampled waveform, i.e., a discrete-time version of a continuous-time template signal. Alternatively, one may use an extrapolation function to describe a waveform that approximates the desired template signal, and store the function, rather than the waveform itself. As yet another alternative, one may store only a limited number of points (i.e., a template signal with a limited size) of a desired template signal. The extrapolation function and the limited-size template signal reduce the storage space (e.g., disk space, memory capacity, and the like) used to store the template signal.

Figure 32:
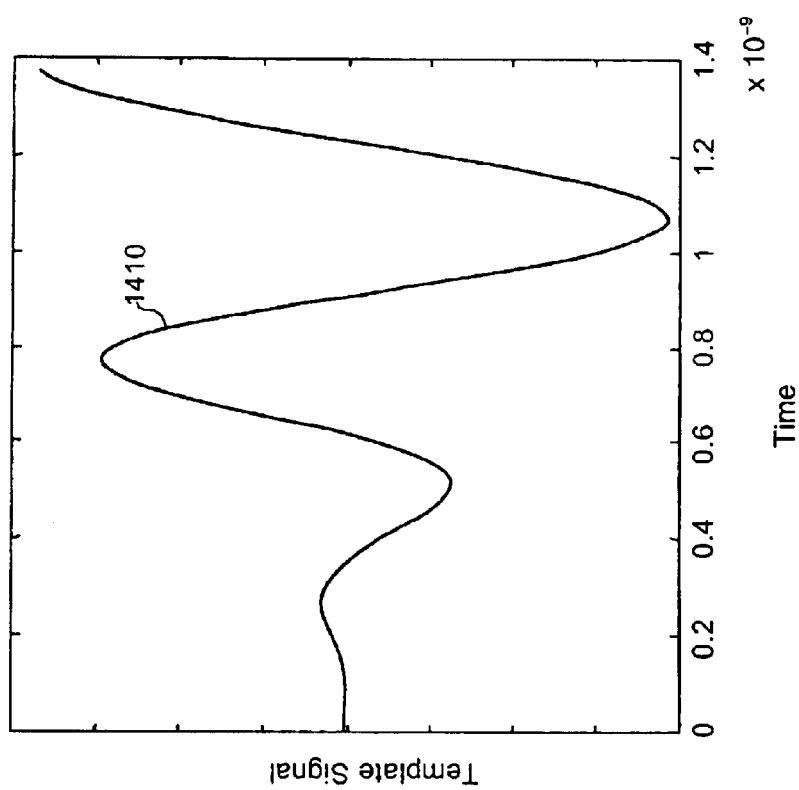
FIG. 32 shows a discrete-time, or sampled, template signal for use in a first-arriving-pulse detector circuitry according to the invention.

FIG. 32 illustrates an exemplary waveform 1410 of a sampled template signal. In exemplary embodiments, the waveform 1410 comprises a 72-point discrete-time sampled version of a continuous-time Gaussian doublet. Note, however, that one may use a template signal with different characteristics, e.g., a different numbers of samples, as desired. To use the waveform 1410, one would store the time position and the amplitude for each of the 72 points. The correlator circuitry within the FAP detector circuitry would operate on each of those 72 sample points.

Figure 33:
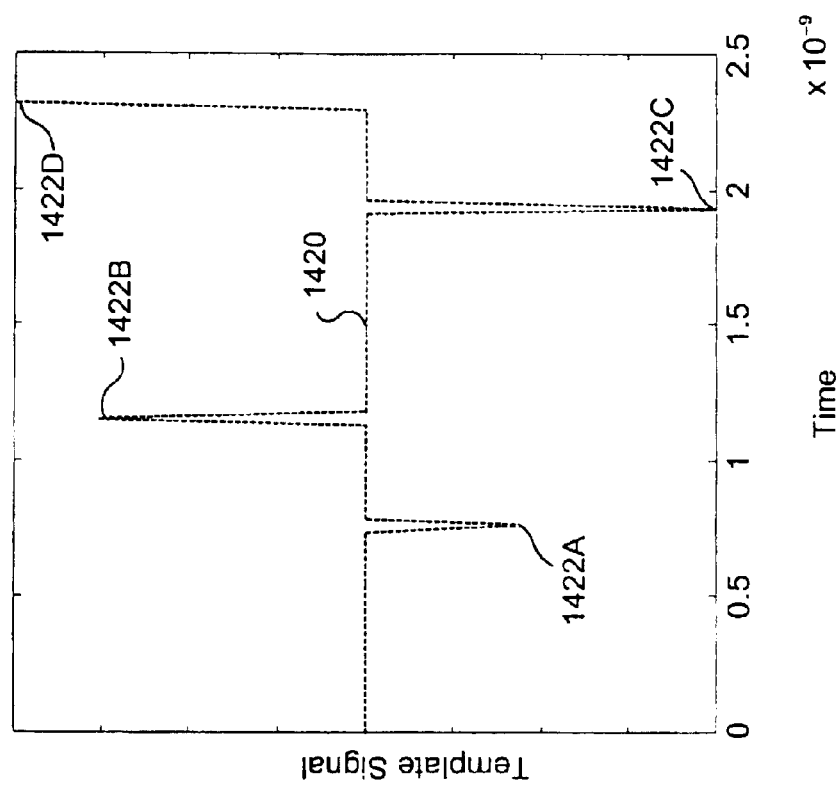
FIG. 33 depicts a limited-size template signal for use in a first-arriving-pulse detector circuitry according to the invention.

FIG. 33 shows an exemplary waveform 1420 of a limited-size template signal. The stored template signal includes the time positions and amplitudes of the points shown as spikes 1422A, 1422B, 1422C, and 1422D. The spikes 1422A, 1422B, 1422C, and 1422D correspond to the local minima and maxima of a desired template signal (for example, the template signal of FIG. 32). Rather than using the local minima and maxima, one may use other techniques to store a limited-size template signal, as desired and depending on the application, as persons skilled in the art would understand. An alternative decision criterion may use the relative positions of the peaks and their respective amplitudes.

Figure 34:
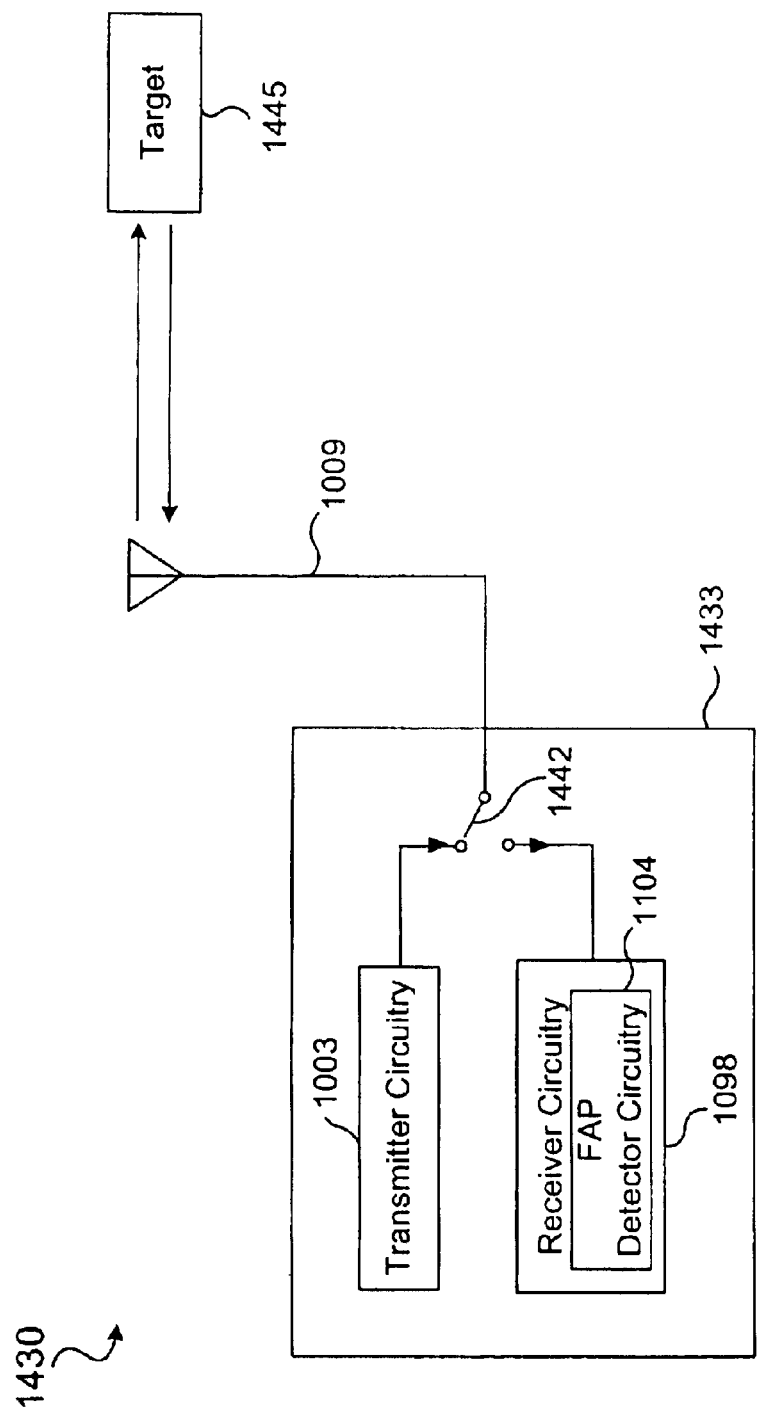
FIG. 34 illustrates a radar system that includes a first-arriving-pulse detector circuitry according to the invention.
Figure 35:
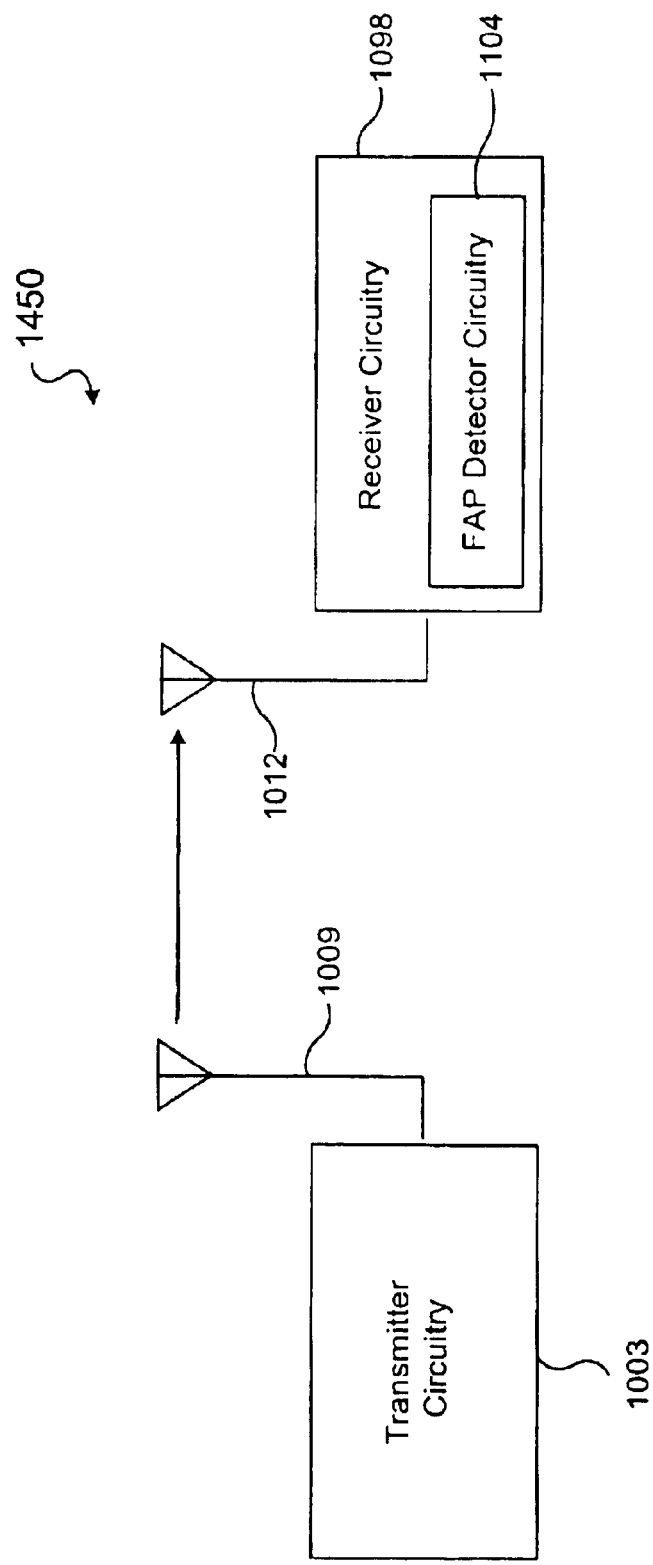
FIG. 35 shows a communication system that comprises a transmitter circuitry and a receiver circuitry, wherein the receiver circuitry includes a FAP detector circuitry according to the invention.
Figure 36:
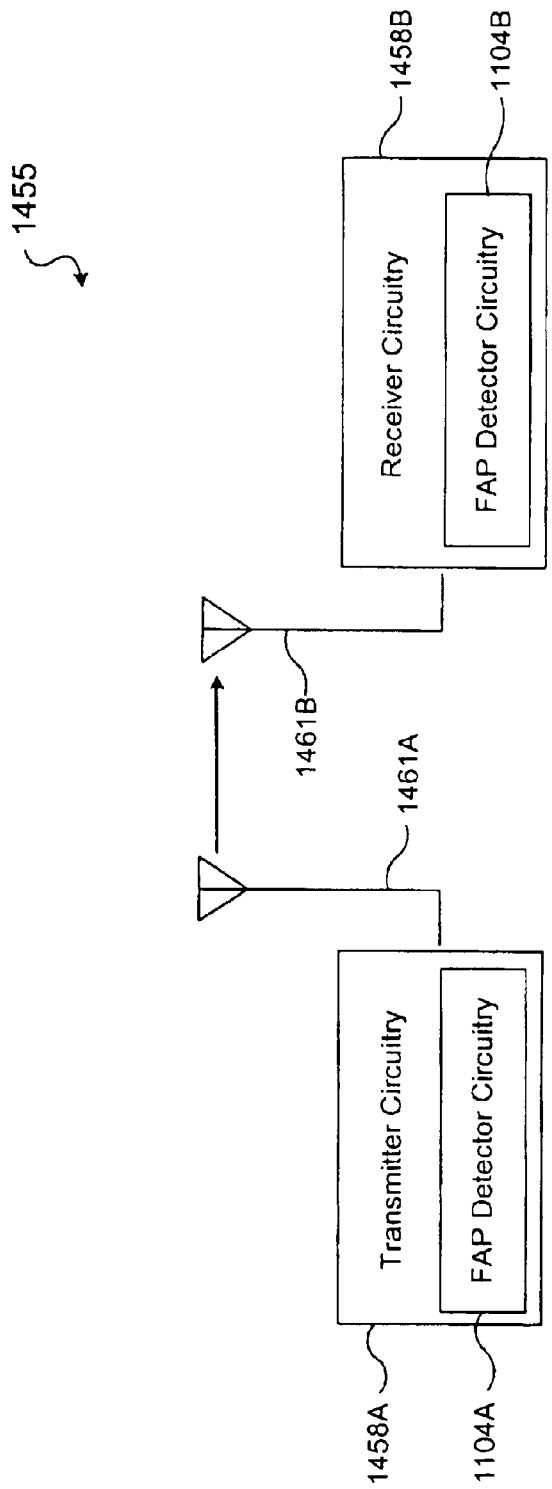
FIG. 36 depicts a communication system that comprises a pair of transceiver circuitries, wherein each transceiver circuitry includes a FAP detector circuitry according to the invention.

One may use FAP detector circuitries according to the invention in a wide variety of communication, radar, positioning, and ranging systems. By way of illustration, FIGS. 34–36 provide some examples of such systems. Other examples of the applications of FAP detector circuitry according to the invention appear in FIGS. 16 and 18–21. FIG. 34 shows a system 1430 that includes a radar circuitry 1433. The radar circuitry 1433 includes a transmitter circuitry 1003, a receiver circuitry 1098, a FAP detector circuitry 1104, and a mode switch 1442. The mode switch 1442 allows the radar system to operate in the transmit mode or in the receiver mode, as desired. The radar system 1433 transmits and receives signals via an antenna 1009.

In operation, the radar circuitry 1433 transmits an RF pulse via the antenna 1009. In exemplary embodiments, the RF pulse comprises an ultra-wideband pulse, i.e., a Gaussian monocycle. After transmitting the RF pulse, the radar circuitry 1433 switches to its receiving mode. The transmitted pulse arrives at a target 1445. The target 1445 reflects the transmitted signal. The radar system 1433 receives the reflected signal via the antenna 1009. Using the FAP detector circuitry 1104 according to the invention, the radar circuitry 1433 detects the position of the first-arriving pulse. The first-arriving pulse typically corresponds to the reflected signal and, thus, the distance between the radar circuitry 1433 and the target 1445.

Note that, although FIG. 34 shows the FAP detector circuitry 1104 as residing within the receiver circuitry 1098, one may place the FAP detector circuitry 1104 in other locations within the system 1430. For example, if the receiver and transmitter circuitry share some of their circuitry, one may place the FAP detector circuitry within the shared circuitry. As another example, one may place the FAP detector circuitry within the radar circuitry 1433, but not within the receiver circuitry 1098. In that case, the FAP detector circuitry 1104 would couple to the transmitter circuitry 1003, the receiver circuitry 1098, or other circuitry within the radar circuitry 1433, as persons skilled in the art would understand.

FIG. 35 illustrates a communication system 1450 that comprises a transmitter circuitry 1003, a receiver circuitry 1098, and a FAP detector circuitry 1104 according to the invention. The transmitter circuitry 1003 transmits signals to the receiver circuitry 1098 via a transmitter antenna 1009. The receiver circuitry 1098 receives the transmitted signals via a receiver antenna 1012. The receiver circuitry 1098 processes the received signals, as desired, for example, by demodulating, filtering, and the like. The FAP detector circuitry 1104 detects the first-arriving pulse, i.e., the first pulse that arrives at the receiver circuitry 1098.

Note that, although in the system of FIG. 35 the FAP detector circuitry 1104 resides within the receiver circuitry 1098, one may use other circuit arrangements, as desired. For example, one may place the FAP detector circuitry 1104 outside the receiver circuitry 1098, and couple the FAP detector circuitry 1104 to the receiver circuitry 1098. FIG. 16 shows such an arrangement. Referring to FIG. 35, note also that the FAP detector circuitry 1104, the receiver circuitry 1098, or both, may couple to a processor circuitry (not shown in FIG. 35), as desired. The processor circuitry may provide further processing functions, for example, baseband processing, signal processing, and the like. The processor circuitry may comprise a DSP or other type of processor, as desired.

FIG. 36 illustrates a communication system 1455 that comprises a first transceiver circuitry 1458A and a second transceiver circuitry 1458B. The transceiver circuitry 1458A comprises a first FAP detector circuitry 1104A according to the invention. Similarly, the transceiver circuitry 1458B includes a second FAP detector circuitry 1104B according to the invention. The transceiver circuitry 1458A transmits signals to, and receives signals from, transceiver circuitry 1458B via a first antenna 1461A. Similarly, The transceiver circuitry 1458B transmits signals to, and receives signals from, transceiver circuitry 1458A via a second antenna 1461B.

Each of the first transceiver circuitry 1458A and the second transceiver circuitry 1458B processes the received signals, as desired, for example, by demodulating, filtering, and the like. The FAP detector circuitry 1104A and the FAP detector circuitry 1104B detect the first-arriving pulse at the first transceiver circuitry 1458A and the second transceiver circuitry 1458B, respectively (i.e., the first pulses that arrive at the first transceiver circuitry 1458A and at the second transceiver circuitry 1458B, respectively).

Note that the first transceiver circuitry 1458A, the second transceiver circuitry 1458B, or both, may include may include a processor circuitry (not shown in FIG. 36), as desired. The processor circuitry may provide further processing functions, for example, baseband processing, signal processing, and the like. The processor circuitry may comprise a DSP, or other type of processor circuitry, as desired. Also note that, rather than using a first transceiver circuitry 1458A and a second transceiver circuitry 1458B in a communication system, one may employ a system that comprises a transmitter circuitry and one or more transceiver circuitries. Each of the transceiver circuitries may include a FAP detector circuitry according to the invention, as desired.

Transceiver circuitries that include FAP circuitry according to the invention prove useful in certain mobile telephony applications. In particular, using FAP circuitries according to the invention enables more precise positioning and ranging in position-based commerce. In position-based commerce, the vendor seeks to ascertain the location, range, or both, of customer mobile units with accuracy. Ranging apparatus that incorporate the invention provide that capability, especially in indoor applications, where traditional positioning and ranging equipment perform poorly or fail to perform at all. More generally, apparatus that includes the invention proves useful in situations where one desires to locate the user of a mobile telecommunication apparatus (for example, in an emergency situation).

Note that the FAP detector circuitries according to the invention lend themselves to various design and implementation choices, as a person skilled in the art would understand. Referring to exemplary embodiments of the invention, the transmitted pulse comprises an ultra-wideband pulse, i.e., a Gaussian monocycle. FAP detector circuitry according to the invention, however, may operate effectively with other types of pulses, as persons skilled in the art would understand. Moreover, for the sake of facilitating the presentation of the invention, the above description of FAP detector circuitries according to the invention refers to the transmission of a pulse from a transmitter. Persons skilled in the art would understand that one may effectively use FAP detector circuitry according to the invention if the transmitter transmits a plurality of pulses.

Furthermore, the processor circuitries referenced in the description of the invention may comprise a data processor circuitry of any suitable type and configuration. By way of illustration, the processor circuitry may comprise a digital signal-processor (DSP), a complex instruction-set machine (CISC), a reduced instruction-set machine (RISC), and the like. More generally, one may implement the FAP detector circuitry according to the invention, the processor circuitry, or both, using a variety of circuit types and configurations. For example, one may realize a FAP detector circuitry, a processor circuitry, or both, using a state machine, gate arrays, programmable logic-devices, and the like, as persons skilled in the art would understand. Moreover, one may implement a FAP detector circuitry using software, hardware, or a combination of hardware and software, as desired, consistent with the embodiments of the invention described here.

One aspect of the invention contemplates generating and storing a suitable template signal. The description of the invention provides several techniques for doing so by way of illustration. Persons skilled in the art will recognize that one may generate and store a suitable template signal in other ways, as desired. Moreover, the above description of the invention includes an efficient searching technique for detecting the first-arriving pulse. Again, persons of ordinary skill in the art, however, will understand that other searching techniques exist, and that one may use those techniques effectively in FAP detector circuitries according to the invention.

Further modifications and alternative embodiments of this invention will be apparent to persons skilled in the art in view of this description of the invention. Accordingly, this description teaches those skilled in the art the manner of carrying out the invention and are to be construed as illustrative only. The forms of the invention shown and described should be taken as exemplary embodiments of the invention.

Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

I claim:

1. A first-arriving pulse detector circuitry, comprising:
    a correlator circuitry configured to correlate a received signal with a template signal to provide an output signal, in which the received signal comprises an ultra-wideband signal, wherein the received signal comprises a plurality of pulses that result from a transmission of a radio-frequency pulse into a multipath propagation medium, and wherein the plurality of pulses of the received signal comprises the first-arriving pulse, in which the correlator circuitry further comprises:
        a multiplier circuitry configured to provide an output signal that comprises the product of the template signal and the received signal; and
        an integrator circuitry configured to integrate the output signal of the multiplier circuitry to provide the output signal of the correlator circuitry; and
    a threshold circuitry configured to, in response to the first-arriving signal in the received signal, provide a first-arriving-pulse signal depending on the relative values of the output signal of the correlator circuitry and a threshold signal derived from a noise floor, in which the threshold circuitry further comprises a comparator circuitry configured to compare the output signal of the correlator circuitry with the threshold signal to provide the first-arriving-pulse signal, in which the first-arriving-pulse signal tends to indicate a time position of the first-arriving pulse in the received signal, in which the threshold signal comprises a first number added to the product of a second number and a third number, in which the first number comprises the average of the noise floor, the second number comprises the standard deviation of the noise floor, and the third number comprises a scaling factor.

2. The circuitry of claim 1, in which the template signal comprises a limited-size template signal.

3. The circuitry of claim 1, in which the template signal comprises a discrete-time signal.

4. A radio-frequency (RF) apparatus, comprising:
    a radio-frequency circuitry configured to operate on a received signal, wherein the received signal comprises a plurality of pulses that result from a transmission of a radio-frequency pulse in a multipath propagation medium, in which the radio-frequency pulse transmitted in the multipath propagation medium comprises an ultra-wideband signal, and wherein the plurality of pulses of the received signal comprises a first-arriving pulse; and
    a detector circuitry configured to discriminate from a noise floor the first-arriving pulse of the received signal, in which the detector circuitry further comprises a correlator circuitry configured to correlate the received signal with a template signal to provide an output signal, in which the detector circuitry further comprises a threshold circuitry configured to provide a first-arriving-pulse signal by comparing the output signal of the correlator circuitry to a threshold signal, wherein the first-arriving-pulse signal tends to indicate a time position of the first-arriving pulse in the received signal, in which the threshold signal comprises a first number added to the product of a second number and a third number, in which the first number comprises the average of the noise floor, the second number comprises the standard deviation of the noise floor, and the third number comprises a scaling factor.

5. The circuitry of claim 4, in which the template signal comprises a limited-size template signal.

6. The circuitry of claim 4, in which the template signal comprises a discrete-time signal.

7. A communication system, comprising:
a transmitter circuitry configured to transmit a radio-frequency pulse into a multipath propagation medium, in which the radio-frequency pulse transmitted in the multipath propagation medium comprises an ultra-wideband signal;
a receiver circuitry configured to operate on a received signal, wherein the received signal comprises a plurality of pulses that result from the transmission of the pulse into the multipath propagation medium, and wherein the plurality of pulses of the received signal comprises a first-arriving pulse, in which the receiver circuitry comprises a scanning receiver circuitry; and
a detector circuitry configured to discriminate from a noise floor the first-arriving pulse of the received signal, in which the detector circuitry further comprises a correlator circuitry configured to correlate the received signal with a template signal to provide an output signal, in which the detector circuitry further comprises a threshold circuitry configured to provide the first-arriving-pulse signal by comparing the output signal of the correlator circuitry to a threshold signal, in which the threshold signal comprises a first number added to the product of a second number and a third number, in which the first number comprises the average of the noise floor, the second number comprises the standard deviation of the noise floor, and the third number comprises a scaling factor.

8. The system of claim 7, wherein the first-arriving-pulse signal tends to indicate a time position of the first-arriving pulse in the received signal.

9. The system of claim 8, in which the transmitter circuitry, the receiver circuitry, and the detector circuitry reside within a radar circuitry.

10. The system of claim 9, in which the receiver circuitry couples to a processor circuitry.

11. The system of claim 10, in which the detector circuitry resides within the processor circuitry.

12. The system of claim 9, in which the detector circuitry resides within the receiver circuitry.

13. The system of claim 8, in which the detector circuitry resides within a processor coupled to the receiver circuitry.

14. The system of claim 8, in which the detector circuitry resides within the receiver circuitry.

15. The system of claim 14, in which the receiver circuitry couples to a processor circuitry.

16. The system of claim 8, in which the detector circuitry resides within a first transceiver circuitry.

17. The system of claim 16, in which the receiver circuitry resides within the first transceiver circuitry.

18. The system of claim 17, in which the detector circuitry resides within the first transceiver circuitry.

19. The system of claim 18, in which the transmitter circuitry resides within a second transceiver circuitry.

20. The system of claim 19, in which the receiver circuitry couples to a processor circuitry.

21. The system of claim 20, in which the detector circuitry resides within the processor circuitry.

22. The system of claim 21, in which the detector circuitry resides within the receiver circuitry.

23. A method of detecting a first-arriving pulse, comprising:
correlating a received signal with a template signal to provide a correlation output signal, in which the received signal comprises an ultra-wideband signal, in which correlating the received signal and the template signal further comprises:
multiplying the template signal and the received signal to provide a product signal; and
integrating the product output signal to provide the correlation output signal,
wherein the received signal comprises a plurality of pulses that result from a transmission of a radio-frequency pulse into a multipath propagation medium, and
wherein the plurality of pulses of the received signal comprises a first-arriving pulse; and
comparing the correlation output signal and a threshold signal to provide a first-arriving-pulse signal, wherein the threshold signal is derived from a noise floor, in which comparing the correlation output signal and a threshold signal further comprises using a comparator circuitry configured to compare the correlation output signal and the threshold signal to provide the first-arriving-pulse signal, in which the first-arriving-pulse signal tends to indicate a time position of the first-arriving pulse in the received signal in which the threshold signal comprises a first number added to the product of a second number and a third number, in which the first number comprises the average of the noise floor, the second number comprises the standard deviation of the noise floor, and the third number comprises a scaling factor.

24. The method of claim 23, in which the template signal comprises a limited-size signal.

25. The method of claim 23, in which the template signal comprises a discrete-time signal.

26. A method of detecting a first-arriving pulse of a received signal comprising:
transmitting a radio-frequency pulse in a multipath propagation medium, in which the radio-frequency pulse transmitted in the multipath propagation medium comprises an ultra-wideband signal;
receiving, by using a radio-frequency circuitry, the received signal, wherein the received signal comprises a plurality of pulses that result from the transmission of the radio-frequency pulse into the multipath propagation medium, and wherein the plurality of pulses of the received signal comprises a first-arriving pulse; and
discriminating from a noise floor the first-arriving pulse of the received signal by using a detector circuitry, in which using the detector circuitry further comprises correlating the received signal with a template signal to provide a correlation output signal, which further comprises including within the detector circuitry a threshold circuitry configured to provide a first-arriving-pulse signal by comparing the correlation output signal to a threshold signal, which further comprises using the detector circuitry to provide the first-arriving-pulse signal, wherein the first-arriving pulse signal tends to indicate a time position of the first-arriving pulse of the received signal, in which the threshold signal comprises a first number added to the product of a second number and a third number, in which the first number comprises the average of the noise floor, the second number comprises the standard deviation of the noise floor, and the third number comprises a scaling factor.

27. The method of claim 26, in which the template signal comprises a limited-size signal.

28. The method of claim 26, in which the template signal comprises a discrete-time signal.

* * * * *